United States Patent
Maruyama et al.

(10) Patent No.: US 9,148,297 B2
(45) Date of Patent: Sep. 29, 2015

(54) INFORMATION PROCESSOR AND CONTROL NETWORK SYSTEM

(75) Inventors: Tatsuya Maruyama, Hitachi (JP);
Tsutomu Yamada, Hitachinake (JP);
Norihisa Yanagihara, Tokyo (JP);
Shinji Yonemoto, Narashino (JP);
Takashi Iwaki, Ichihara (JP); Hironori Ohashi, Narashino (JP); Yutaka Matsumoto, Narashino (JP)

(73) Assignee: HITACHI, LTD., Tokyo (JP)

(*) Notice: Subject to any disclaimer, the term of this patent is extended or adjusted under 35 U.S.C. 154(b) by 545 days.

(21) Appl. No.: 13/030,272

(22) Filed: Feb. 18, 2011

(65) Prior Publication Data
US 2011/0205886 A1 Aug. 25, 2011

(30) Foreign Application Priority Data
Feb. 25, 2010 (JP) ................. 2010-040419

(51) Int. Cl.
*G01R 31/08* (2006.01)
*H04L 12/40* (2006.01)
*H04L 12/413* (2006.01)
*H04L 12/437* (2006.01)

(52) U.S. Cl.
CPC ........ *H04L 12/40176* (2013.01); *H04L 12/413* (2013.01); *H04L 12/437* (2013.01)

(58) Field of Classification Search
USPC ................. 370/216–224, 242–244
See application file for complete search history.

(56) References Cited

U.S. PATENT DOCUMENTS

| | | | |
|---|---|---|---|
| 5,469,428 A * | 11/1995 | Tokura et al. | 370/224 |
| 6,065,073 A | 5/2000 | Booth | |
| 6,714,558 B1 | 3/2004 | Patel et al. | |
| 7,664,052 B2 | 2/2010 | Oku et al. | |
| 7,706,256 B2 * | 4/2010 | Ge et al. | 370/222 |
| 8,355,348 B1 * | 1/2013 | Miller et al. | 370/256 |
| 2006/0209681 A1 * | 9/2006 | Yamamoto | 370/218 |
| 2009/0274044 A1 | 11/2009 | Goose et al. | |
| 2009/0290487 A1 * | 11/2009 | Takatori et al. | 370/225 |

(Continued)

FOREIGN PATENT DOCUMENTS

| | | |
|---|---|---|
| JP | 3-145239 | 6/1991 |
| JP | 5-327743 | 12/1993 |
| JP | 2003-060666 | 2/2003 |

(Continued)

OTHER PUBLICATIONS

Office Action issued in Japanese Patent Application No. 2010-040419 on Jul. 16, 2013.

*Primary Examiner* — Phuc Tran
(74) *Attorney, Agent, or Firm* — Baker Botts L.L.P.

(57) ABSTRACT

An information processor capable of ensuring time synchronization accuracy, ensuring EtherCAT command consistency, and easily developing the software based on a 2-port configuration even when a communication path error occurs includes: an arithmetic section; at least two communication sections each including a transmission section and a reception section; and a redundant communication control section that controls a communication path between the arithmetic section and the communication section. The redundant communication control section includes: a communication path state determination section that determines a network path state; and a redundant path switching section that switches connection between the arithmetic section and at least two communication sections.

18 Claims, 21 Drawing Sheets

(56) References Cited

U.S. PATENT DOCUMENTS

2010/0226244 A1* 9/2010 Mizutani et al. ............. 370/220
2011/0182300 A1* 7/2011 Chandhoke .................. 370/438

FOREIGN PATENT DOCUMENTS

JP          2004-096460        3/2004
JP          2007-259406        10/2007

* cited by examiner

INFORMATION PROCESSOR AND CONTROL NETWORK SYSTEM

CLAIM OF PRIORITY

The present application claims priority from Japanese Patent Application No. 2010-040419 filed on Feb. 25, 2010, the content of which is hereby incorporated by reference into this application.

BACKGROUND OF THE INVENTION

1. Field of the Invention

The present invention relates to an information processor including information processing hardware and information processing software used for redundant networks for real-time communication and to a control network system including the information processor and control targets.

2. Description of the Related Art

In some control systems, a single control computer controls one or more control targets via a network. As a control system example, a control network system allows one control computer to be connected with multiple control targets via the ring topology. In this control network system, a control packet is transmitted from the control computer to multiple control targets in order. The control packet may be composed of control instructions for the control targets.

The network topology may be specified as a logical ring topology. In this case, the star topology or the bus topology may be available on the condition that the control packet is transmitted to control targets in order. Control systems based on the ring topology include EtherCAT (registered trademark) and SERCOS (registered trademark), for example.

Generally, the control computer repeatedly performs a specified control process on a control target at a specified cycle. The cycle causes temporal restriction on the control process. The temporal restriction results from the performance or the control scheme required of the control system. The temporal restriction needs to be satisfied for the communication between the control computer and a control target. On the other hand, little or no temporal restriction is imposed on acquisition of statistic information in order to diagnose or monitor control targets.

EtherCAT (Communication Profile Family 12 of IEC61784 Part 2) is available as real-time Ethernet (registered trademark) and configures ring topology using a master provided as the control computer and a slave device (hereafter referred to simply as a slave) attached to a control target. Generally, the slave has two Ethernet ports. The Ethernet ports of slaves are successively connected to configure the ring topology. The master may include one Ethernet port.

When the control network system uses the master having one Ethernet port, the last slave on the ring network internally loops back a packet to finally return the packet to the Ethernet port of the master. For example, the network physically or seemingly configured as line topology can logically function as the ring topology from the viewpoint of the packet communication path.

Such control system may be subject to requirements for the temporal restriction and may require additional processes in order to perform the reliable control processing. Especially, additional processes are needed when a serious disadvantage might result from unsuccessful control processing caused by an error occurrence on the communication path. There is provided a method of making the communication path redundant in order to configure highly reliable ring topology including the single control computer and multiple control targets. Such a technology is known in the prior art in the patent document of Japanese Laid Open Patent JP-2004-96460 or JP-2003-60666.

Connection to the ring topology is made redundant by providing the EtherCAT master with two Ethernet communication ports. When the EtherCAT master is physically provided with two communication ports, an available method of ensuring the redundancy is to transmit the same packet from both of the two communication ports.

Generally, however, the following three problems arise when the conventional method is used to make the EtherCAT master redundant.

Firstly, when the EtherCAT ring network is disconnected, the EtherCAT time synchronization function may not be fully available. The EtherCAT time synchronization function is outlined below. The EtherCAT time synchronization function includes three stages: measuring a communication delay between slaves; compensating an offset between slave clocks; and compensating an advance drift between the slave clocks. The communication delay measurement between slaves is based on an algorithm as shown in FIG. 14.

FIG. 14 shows a packet communication path and reception times at ports of EtherCAT slave ICs 151a, 151b, and 151c. Reference symbols Ta, Tb, Tc, Td, and Te in FIG. 14 denote times for the ports to receive a packet. Reference symbol tdiff denotes a communication delay between the slaves. Reference symbol tp denotes a processing time period of an EtherCAT Processor Unit 160.

Regarding slave A, a clock in the same slave IC 151a measures Ta and Te. The slave IC 151a differs from the slave IC 151b in clock offsets or drifts. It is impossible to simply compare Ta and Te with Tb and Td. Let us suppose that Ta through Te in FIG. 14 are measurable and tp is known. Then, communication delay tdiffBC between slaves C and B is calculated as follows.

$$tdiffBC=(Td-Tb)\div 2$$

where (Tc−Tb) and (Td−Tc) are assumed to be equal. It is also assumed that the EtherCAT slaves use the same type of processor unit. When different processor units are used, tp differences need to be taken into consideration.

The following equations find communication delay tdiffAB between slaves B and A.

$$tdiffAB=((Te-Ta)-(Td-Tb)-tp)\div 2+tp$$

$$tdiffBA=tdiffAB-tp$$

An EtherCAT slave incompatible with the time synchronization function is assumed to be a mere communication path. In other words, packets need to be transferred at a fixed communication delay.

A time synchronization packet needs to circulate through the ring network in order to enable the time synchronization function. In other words, a communication delay is calculated based on packet reception times on the forward and backward paths for a given slave.

The EtherCAT master may have two communication ports each transmitting time synchronization packets. The packets do not circulate through the ring network and are received at the other communication port than that used for the transmission. Accordingly, it is impossible to calculate a communication delay for the time synchronization.

(Software-Based Redundant Processing)

As another possible redundant method, only one communication port transmits a packet. The packet is looped inside a slave farthest from the packet transmission port, that is, a slave adjacent to the other port of the master. In this case, when the network malfunctions, the same communication port transmits a packet and receives it. Software for the EtherCAT master is used to transmit the packet from the other communication port.

However, the software processing causes a long delay and jitter compared to the packet transfer processing of a slave. This software processing needs to transfer packets at a fixed communication delay as well as an EtherCAT slave incompatible with the time synchronization function.

The synchronization accuracy degrades compared to the time synchronization function for the normal network.

Secondly, commands transmitted from the master may be inconsistent. Especially, the consistency may not be ensured for commands for logical addresses and auto-increment addresses.

(Command Consistency for Logical Addresses)

The following describes a problems of commands concerning logical addresses. The EtherCAT function can map any address spaces for the slaves to a single virtual address space. This virtual address space is referred to as a logical address.

According to the normal redundant configuration for the EtherCAT master, a network error, if any, may cause each of two communication ports to transmit a packet containing a command. Some commands are issued to addresses corresponding to EtherCAT slaves such as station addresses for specifying individual slaves. A packet containing the commands can be issued by determining to which of the two communication ports the slave is connected.

When a command corresponds to the logical address, however, an address to be read or written by the single command may be mapped to the slaves belonging to portions of the network divided by the error. In this case, the EtherCAT master needs to manage a correspondence table of logical addresses and combine results of the command corresponding to the logical address while ensuring the command consistency. This complicates development of the software.

(Command Consistency for Auto-Increment Addresses)

Commands for auto-increment addresses also cause a problem. An EtherCAT auto-increment address is based on EtherCAT slave addressing in accordance with an arrival sequence of packets. When each of the slaves receives a packet having an auto-increment address, the slave determines whether the address equals 0. The slave increments the address value and transfers the packet to the next slave.

FIG. 12 shows how auto-increment addresses specify the slaves. As shown in FIG. 12, the control network system includes multiple slaves 121 connected to a control computer 120 via a network 122. To communicate with the fourth slave (n=4), for example, the master sets the auto-increment address to −3.

An error occurrence on the network 122 changes the packet processing sequence. A packet is processed on an EtherCAT slave different from that intended by a developer. FIG. 13 shows auto-increment addresses for the slaves 121a through 121e when an error occurs on the network 122. According to the configuration in FIG. 13, two communication ports in the control computer 120 simultaneously transmit packets. A path error occurs between the slaves n=3 and n=4 and disconnects the network 122, changing the auto-increment addresses of the fourth and fifth slaves as the original orders.

Thirdly, the software needs to be developed in consideration for two communication ports used for the redundant EtherCAT master. The software development becomes more complicated than that for conventional EtherCAT masters having one port with respect to command combination in the event of an error and the time synchronization, for example.

In short, the conventional information processor based on the redundant configuration of the general-purpose EtherCAT master and the control network system using such information processor entail the problems of a decrease in the time synchronization accuracy, the need for ensuring the EtherCAT command consistency, and the complicated software development due to the 2-port configuration.

The present invention has been made in consideration of the foregoing. It is therefore an object of the invention to provide an information processor and a control network system using the same for configuring a network capable of improving the time synchronization accuracy, ensuring the EtherCAT command consistency, and facilitating the software development for the 2-port configuration.

SUMMARY OF THE INVENTION

To achieve the above-mentioned object, an information processor according to the invention controls one or more control targets via a network and includes: an arithmetic section; at least two communication sections each including a transmission section for transmitting packet to a network and a reception section for receiving a packet from a network; and a redundant communication control section that is provided between the arithmetic section and the communication section and controls a communication path.

The arithmetic section transmits an instruction value for the control target to the redundant communication control section and receives a result of communication with the control target from the redundant communication control section.

The communication section transmits a communication content received from the redundant communication control section to the control target via the network and transmits a result received from the control target to the redundant communication control section.

The redundant communication control section includes: a communication path state determination section for determining a path state of the network; and a redundant path switching section for switching connection between the arithmetic section and at least the two communication sections.

The network for connecting the one or more control targets with the communication section provides a logical ring topology. The redundant path switching section functions based on the communication path state determined by the communication path state determination section and changes a connection path between the communication sections and a communication path between the communication section and the arithmetic section to communication paths having different logical ring topologies.

Preferably, the communication section includes a transmission section for transmitting a packet to the network; and a reception section for receiving a packet from the network. When the communication path normality determination section determines a communication path to be normal, the redundant path switching section connects the arithmetic section with one of the communication sections and connects a reception section with a transmission section for the other communication section to configure a logical ring topology. When the communication path abnormality determination section determines a communication path to be abnormal, the redundant path switching section connects the transmission section for the arithmetic section with the transmission section for the communication section, connects the reception section with a transmission section for the other communication section, and connects the reception section with a reception section for the arithmetic section to configure the logical ring topology.

The present invention can improve time synchronization accuracy, ensure EtherCAT command consistency, and easily develop the software based on a 2-port configuration.

DETAILED DESCRIPTION OF THE PREFERRED EMBODIMENTS

Embodiments of the present invention will be described in further detail with reference to the accompanying drawings.

[First Embodiment]

Figure 1:
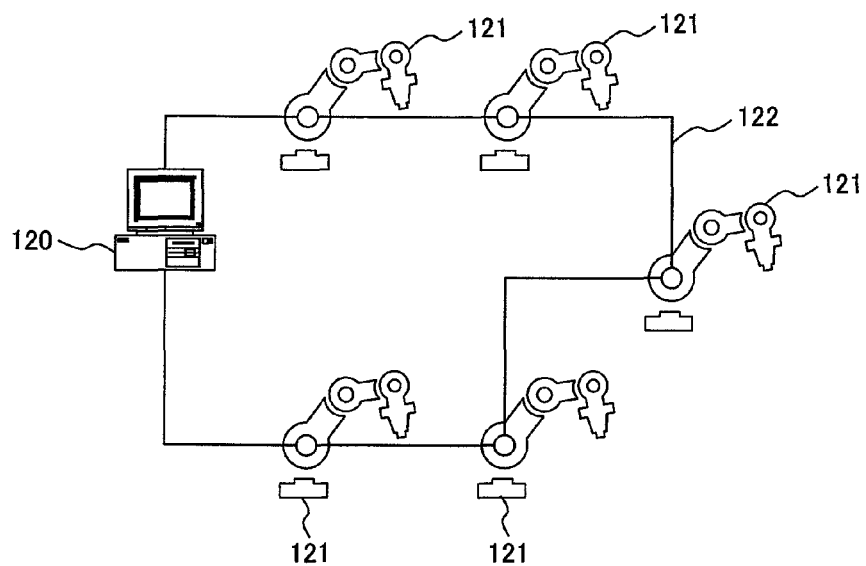
FIG. 1 is a schematic diagram showing the configuration of the control network system according to a first embodiment of the invention.

FIG. 1 is a schematic diagram showing the control network system including the information processor according to the embodiment. As shown in FIG. 1, the information processor according to the embodiment is used as a control computer (master) 120 that controls a control target (slave) 121 connected via a control network 122.

The control computer 120 includes two Ethernet communication ports for connection with the control network 122 and is connected to multiple control targets 121 via the control network 122. The control targets 121 include a servo amplifier and a servomotor. The control network 122 is equivalent to Ethernet (registered trademark). The network in FIG. 1 configures the ring topology and may also use the star topology, the line topology, or the composite topology configured by combining these topologies for the hardware configuration as long as it logically complies with the ring topology.

Figure 2:
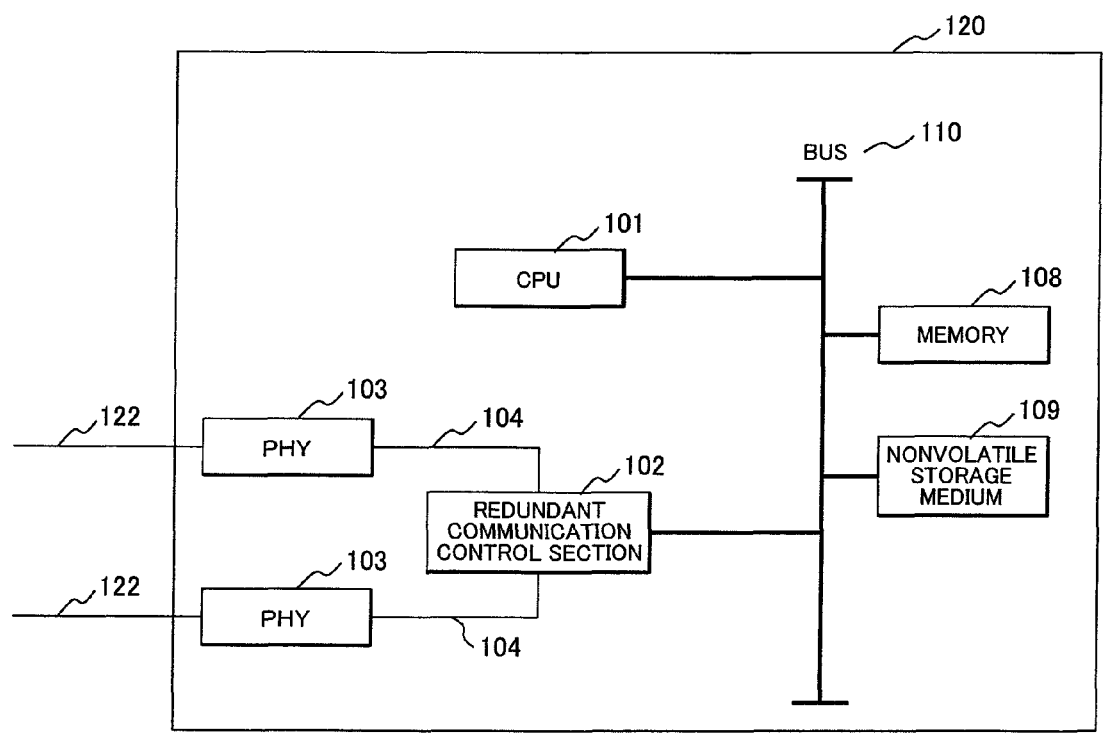
FIG. 2 is a block diagram showing the hardware configuration of a control computer in FIG. 1.

FIG. 2 is a block diagram showing the hardware configuration of the control computer 120. As shown in FIG. 2, the control computer 120 includes a CPU 101, memory 108, a nonvolatile storage medium 109, and a redundant communication control section 102 that are connected with each other via a bus 110. The redundant communication control section 102 connects with a physical layer device (PHY) 103.

The CPU 101 as an arithmetic section transfers a processing program from the nonvolatile storage medium 109 to the memory 108 and executes the program. The processing programs include an operating system (OS) and an application program running under the OS.

The redundant communication control section 102 receives a communication request from the program running on the CPU 101 and communicates with the control network 122 using the PHY 103. The redundant communication control section 102 is implemented as ICs such as FPGA, CPLD, ASIC, and a gate array, for example.

The PHY 103 represents a transceiver IC provided with the function to communicate with the control network 122. The PHY 103 provides an Ethernet PHY (physical layer) chip as the communication standard. According to the configuration in FIG. 2, the PHY 103 connects with the redundant communication control section 102. Therefore, the redundant communication control section 102 includes processing for the Ethernet MAC (Media Access Control) layer. As an available configuration, an IC providing the MAC function may be provided between the redundant communication control section 102 and the PHY 103. As another available configuration, the redundant communication control section 102 may be connected with a communication IC as a combination of the IC providing the MAC function and the PHY 103.

The bus 104 complies with the communication standard for connecting the MAC layer with the PHY layer for Ethernet and includes MII (Media Independent Interface), GMII (Gigabit MII), and RMII (Reduced MII) as examples.

The memory 108 temporarily stores the OS and an application program transferred from the nonvolatile storage medium 109 so that the CPU 101 can execute the program. The nonvolatile storage medium 109 stores information such as a program for operating the CPU 101 and a result of program execution.

The bus 110 connects the CPU 101, the memory 108, the nonvolatile storage medium 109, and the redundant communication control section 102 with each other. The bus 110 represents a PCI bus, an ISA bus, a PCI Express bus, a system bus, and a memory bus, for example.

(Configuration of the Redundant Communication Control Section)

Figure 3:
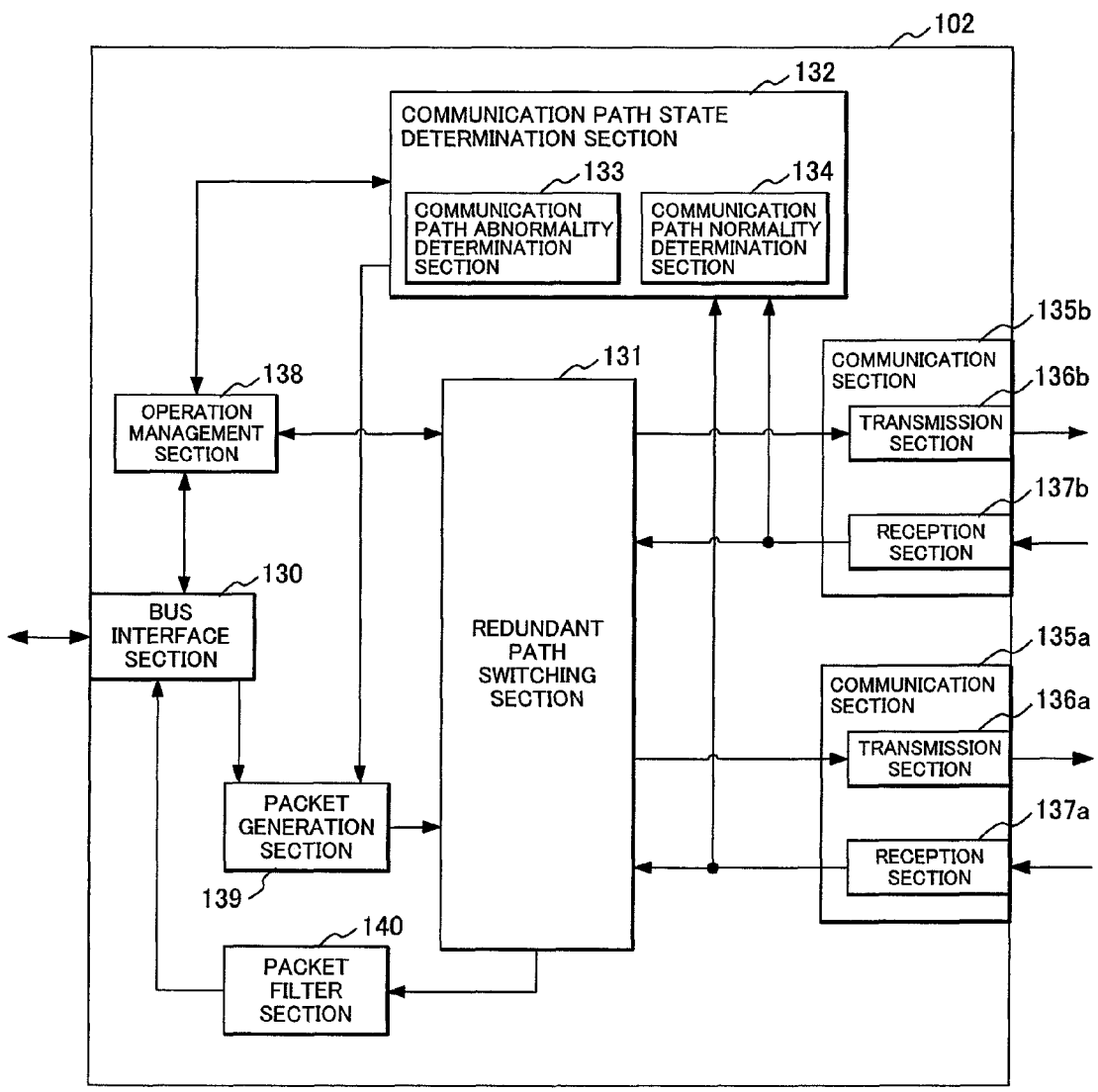
FIG. 3 is a block diagram showing the function configuration of a redundant communication control section in FIG. 2.

FIG. 3 is a block diagram showing the function configuration of the redundant communication control section 102. As shown in FIG. 3, the redundant communication control section 102 includes two communication sections 135a and 135b, a bus interface section 130, a communication path state determination section 132, and a redundant path switching section 131. The communication sections 135a and 135b are connected to the control network 122. The bus interface section 130 is connected to the bus 110. The communication path state determination section 132 determines a communication path state. Based on a determination result from the communication path state determination section 132, the redundant path switching section 131 switches the communication path to the other between the communication section 135a or 135b and the bus interface section 130 connected to the arithmetic section.

The bus interface section 130 communicates with the CPU 101 or the memory 103 in accordance with communication specifications of the bus 110. The bus interface section 130 is connected to the operation management section 138 and the redundant path switching section 131 in the redundant communication control section 102. The bus interface section 130 transmits or receives a packet from the redundant path switching section 131. The bus interface section 130 exchanges control information and state information about the redundant communication control section 102 with the operation management section 138.

The redundant path switching section 131 is provided as a function section capable of switching between packet communication paths. The redundant path switching section 131 functions as a packet communication path and is connected to a packet generation section 139, a packet filter section 140, and the communication section 135. The redundant path switching section 131 changes its internal communication path and connects with the operation management section 138 to acquire the state information.

Figure 8:
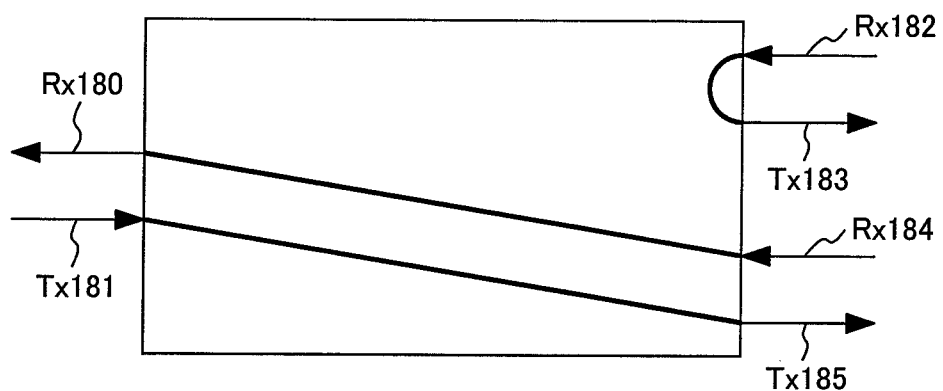
FIG. 8 shows a communication path inside a redundant path switching section in normal mode.
Figure 9:
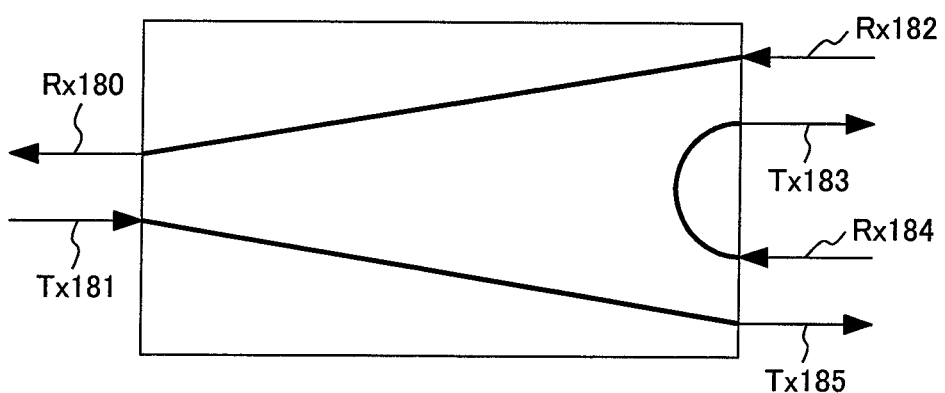
FIG. 9 shows a communication path inside a redundant path switching section in abnormal mode.

FIGS. 8 and 9 show communication paths inside the redundant path switching section 131. The redundant path switching section 131 uses the connection scheme of communication paths shown in FIG. 8 or 9 in accordance with an instruction from the operation management section 138. A reception line Rx 180 connects with the packet filter section 140. A transmission line Tx 181 connects with the packet generation section 139. Packet data from an application running on the CPU 101 passes through the transmission line Tx 181 and is transmitted to the redundant path switching section 131. Packet data received by the redundant path switching section 131 from the network passes through the reception line Rx 180 and is transferred to an application running on the CPU or the memory 108.

The reception line Rx 184 is connected to the reception section 137a of the communication section 135a. The transmission line Tx 185 is connected to the transmission section 136a of the communication section 135a. The reception line Rx 182 is connected to the reception section 137b of the communication section 135b. The transmission line Tx 183 is connected to the transmission section 136b of the communication section 135b.

Back to FIG. 3, the communication sections 135a and 135b are connected to the control network 122 and perform communication in accordance with a communication protocol for the control network 122. According to the configuration in FIG. 2, the PHY 103 is provided outside the redundant communication control section 102. Therefore, the communication section 135 is equivalent to a processing section for the MAC layer. The communication section 135 functions as a connection interface section with the MAC layer when the redundant communication control section 102 is connected to an Ethernet communication device including the MAC layer and the PHY layer. The redundant communication control section 102 may include the PHY function.

The communication section 135a is equivalent to a communication port that transmits a packet transmitted from the packet generation section 139. The communication section 135b is equivalent to a communication port that receives a packet from the last slave in the ring network and loops back the packet. The communication sections 135a and 135b are distinguished from each other only for ease of explanation and give no significance to which of two PHYs 103 preferentially should transmit a packet.

The transmission section 136a, 136b are provided as a transmission function section in the communication section 135 and allows the control computer 120 to transmit a packet to the control network 122. The reception section 137a, 137b are provided as a reception function section in the communication section 135 and receives a packet transmitted from the control network 122.

The operation management section 138 supplies the bus 110 with operation control and states of the redundant communication control section 102 and controls functions of the redundant path switching section 131. The operation management section 138 maybe available as a function register, for example. A program running on the CPU 101 accesses the function register of the operation management section 138 via the bus 110 to control operations or acquire states of the redundant communication control section 102.

Items specifiable in the operation management section 138 include selection of the communication sections 135a and 135b for packet transmission, the number of slaves estimated for the system, criteria for the communication path state determination, and path switching in the redundant path switching section 131. Acquirable information includes the number of slaves connected to the control network 122 and information about a communication path location suspected of an error.

The communication path state determination section 132 includes a communication path abnormality determination section 133 and a communication path normality determination section 134. The communication path abnormality determination section 133 determines abnormality such as disconnection of the control network 122. The communication path normality determination section 134 determines normal communication of the control network 122. The communication path state determination section 132 notifies the operation management section 138 of determination results from the communication path abnormality determination section 133 and the communication path normality determination section 134. The communication path state determination section 132 is connected to reception paths from the reception sections 137a and 137b and monitors packets to determine the communication path state.

The packet generation section 139 responds to a request from the communication path state determination section 132 and changes the content of a packet transmitted from the bus interface section 130 or transmits a new packet. The communication path state determination section 132 issues requests for determining communication path states. When a packet to be transmitted is not modified or added, the packet generation section 139 receives data from the bus interface section 130 and transmits the data without doing anything. When a packet is directly transmitted from the bus interface section 130 to the redundant path switching section 131, the bus interface section 130 and the packet generation section 139 maybe configured to selectively transmit a transmission data signal to the redundant path switching section 131.

The packet filter section 140 notifies the communication path state determination section 132 of an EtherCAT telegram that matches a predetermined condition. The communication path state determination section 132 determines the communication path state based on the content received from the packet filter section 140.

Figure 4:
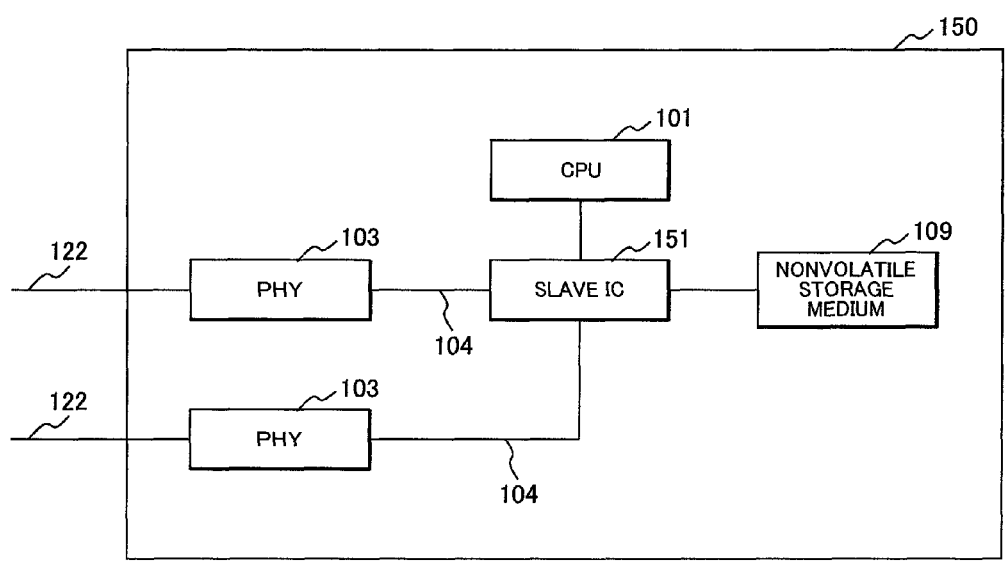
FIG. 4 is a block diagram showing the hardware configuration of an EtherCAT slave.

FIG. 4 is a block diagram showing the hardware configuration of a control target 121. As shown in FIG. 4, the control target 121 is provided with communication hardware for implementing the communication function. Communication hardware 150 includes the CPU 101, the slave IC 151, the nonvolatile storage medium 109, and two PHYs 103. According to an actual configuration, though not shown in the drawing, the CPU is connected to peripheral devices to control sensors and actuators. The slave IC 151 is dedicated to slaves and complies with the EtherCAT specifications defined in Communication Profile Family 12 of IEC61158 or IEC61784 Part 2.

(Configuration of the Slave IC 151)

Figure 5:
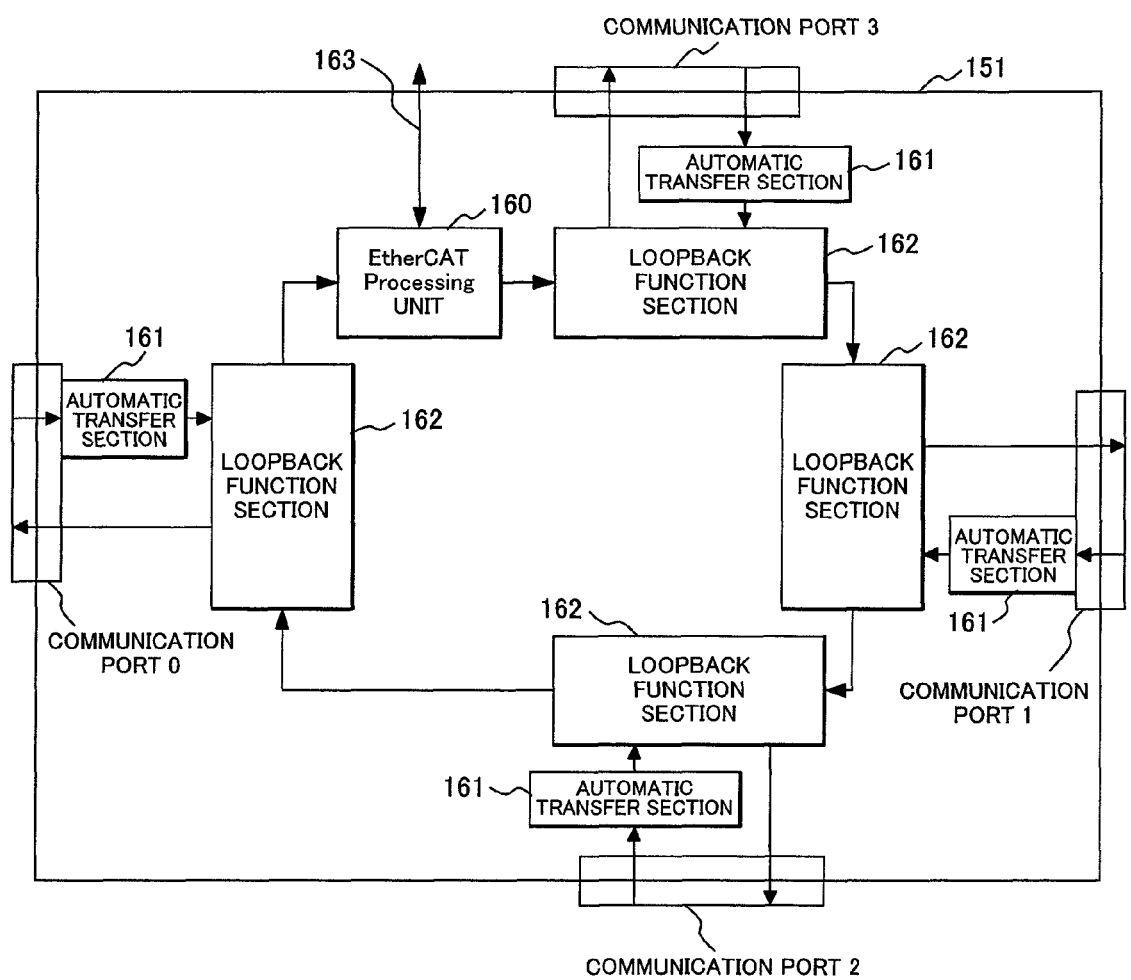
FIG. 5 is a block diagram showing the function configuration of an EtherCAT slave IC.

FIG. 5 is a block diagram showing the function configuration of the slave IC 151 of FIG. 4. As shown in FIG. 5, the slave IC 151 includes an EtherCAT Processing Unit (EPU) 160 and multiple communication ports (four communication ports 0 through 3 in FIG. 5). Each communication port is provided with a loopback function section 162 and an automatic transfer section 161. The loopback function sections 162 are circularly connected to the EPU 160.

The EPU 160 represents an IC device compliant with the EtherCAT specification for communication processing. The EPU 160 is connected to the control network 122 via a bus 163 and notifies the CPU 101 of information about EtherCAT. The CPU 101 configures settings of the EPU 160. Each communication port is connected to an adjacent slave in accordance with the physical specifications (e.g., Ethernet or EBUS) defined for EtherCAT.

The automatic transfer section 161 transfers a received packet to the loopback function section 162. The loopback function section 162 transmits the packet to the communication port or transfers it to the other adjacent loopback function section 162 depending on settings from the EPU 160 and the connection state of the communication path connected to the loopback function section 162. The packet is transferred so as to unidirectionally circulate through the loopback function sections 162 connected to each other. For example, the packet circulates through communication ports 0, 3, 1, 2, and then 0.

The EPU 160 sets the loopback function section 162 based on the communication content transmitted from the control computer 120. The setting examples include Open, Close, Auto and Auto Close modes. The Open mode always transmits a packet to the communication port. The Close mode always transmits a packet to the adjacent loopback function section 162. The Auto mode selects a packet transmission path depending on the setting state of the connected communication port. The Auto Close mode selects a packet transmission path depending on the setting state of the connected communication port but requires the explicit specification from the EtherCAT master when the communication path needs to be reestablished.

In the Auto mode, the loopback function section 162 transmits a packet to the communication port when the communication is established with the adjacent control computer 120 or the control target 121 via the communication port. On the other hand, the loopback function section transfers a packet to the adjacent loopback function section 162 when no communication path is formed with the control computer 120 or the control target 121 or no communication is established with the adjacent control computer 120 or the control target 121 due to an error or a failure on the communication path.

(Dynamic Sequence)

Figure 6:
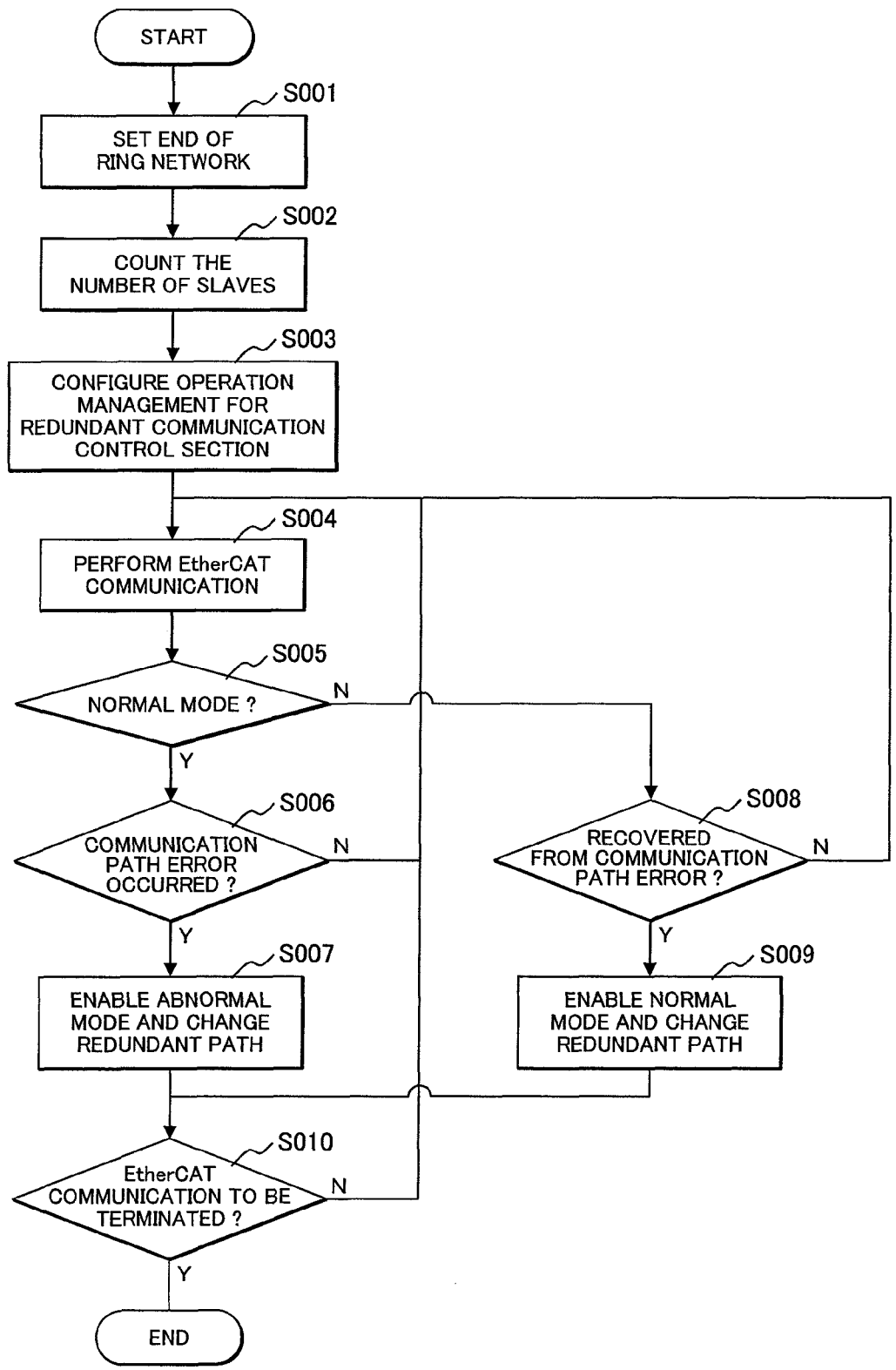
FIG. 6 is a flowchart showing a process of the redundant communication control section in FIG. 3.

The following describes a process of the redundant communication control section 102 in the control computer 120. FIG. 6 is a flowchart showing the process of the redundant communication control section 102.

As shown in FIG. 6, the process sets the internal state of the redundant path switching section 131 to a normal mode (step S001). In the normal mode, the connection state is defined as follows. The control network 122 contains no path error. As shown in FIG. 8, the transmission line Tx 185 and the reception line Rx 184 at one communication port are respectively connected to the transmission line Tx 181 and the reception line Rx 180 at the CPU side so as to transmit and receive packets.

The transmission line Tx 183 and the reception line Rx 182 at the other communication port are connected to each other in the redundant path switching section 131 so as to loop packets back to the control target 121.

After the normal mode is enabled, the redundant communication control section 102 counts EtherCAT slaves connected to the circular control network 122. As a method of counting slaves, a BRD (Broadcast Read) command is issued to a register processed by all slaves to check the working counter. This command is issued in accordance with a request from the operation management section 138. The packet generation section 139 then generates and transmits a packet. The number of slaves (five for this embodiment) is predefined when the system is configured.

The process compares the predefined slave count with a slave count acquired by issuing the BRD command. When the slave counts match, the process proceeds to step S003. When the slave counts differ, an error is considered to occur on the communication path. It is necessary to troubleshoot the communication path with reference to a link lost error counter or the slave count resulting from the issued command.

After the slaves are counted, the process sets the operation management for the redundant communication control section 102 (step S003). Specifically, the operation management section 138 is supplied with prerequisite settings such as the method of determining the communication path state and selection of a communication port to be used. All slaves are set to the Auto mode. When the communication path malfunctions, the loopback function section 162 connected to that communication path transfers a packet to the adjacent communication port.

After the setting for the redundant communication control section 102, the process performs real-time communication appropriate to an application in accordance with a qualified EtherCAT procedure (step S004). During the real-time communication, the communication path state determination section 132 determines whether the redundant path switching section 131 operates in the normal mode (step S005). When this is true, the communication path abnormality determination section 133 determines whether an error occurs on the communication path (step S006).

(EtherCAT Frame and Working Counter (WKC))

Figure 7:
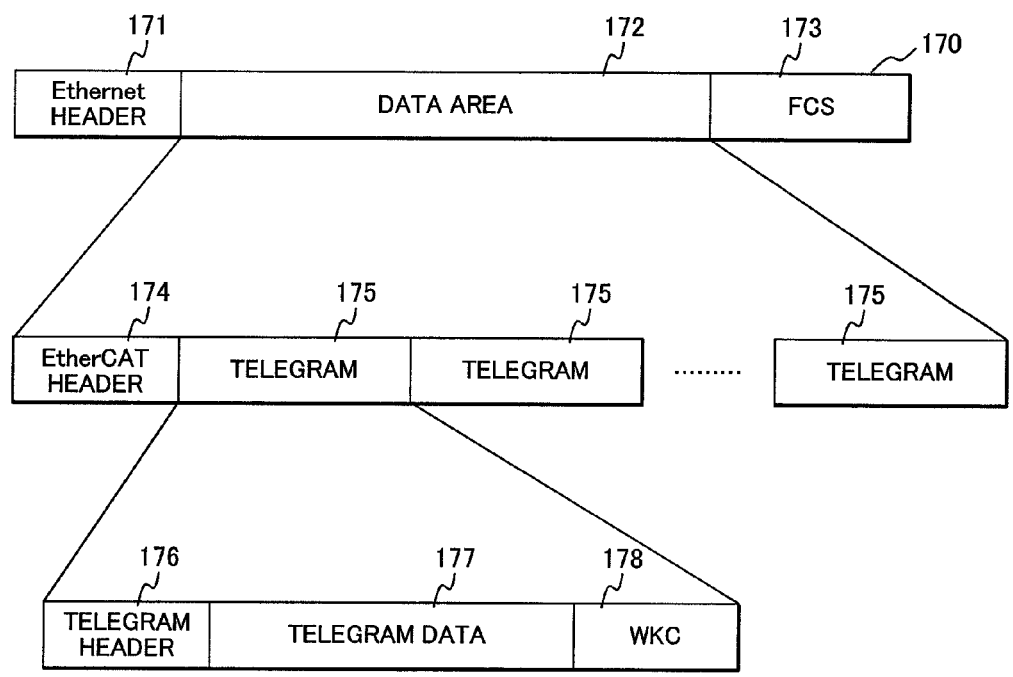
FIG. 7 shows an EtherCAT frame format.

FIG. 7 shows the EtherCAT packet (frame) configuration. As shown in FIG. 7, an EtherCAT frame 170 includes an Ethernet header 171, a data area 172, and a frame check sequence (FCS) 173. The data area 172 stores the EtherCAT communication content. The FCS 173 checks if data in the data area 172 is valid. For EtherCAT, the Type field in the Ethernet header 171 contains 0x88A4.

The EtherCAT data area 172 includes an EtherCAT header 174 and one or more EtherCAT telegrams 175. The EtherCAT telegram 175 includes a telegram header 176, telegram data 177, and a working counter (WKC) 178. The working counter 178 is used as a field. Each time an appropriate slave processes the telegram, the slave increments the working counter 178 by a predetermined value.

The following describes methods of determining whether the communication path is normal or abnormal.

(First Abnormality Determination Method)

Figure 10:
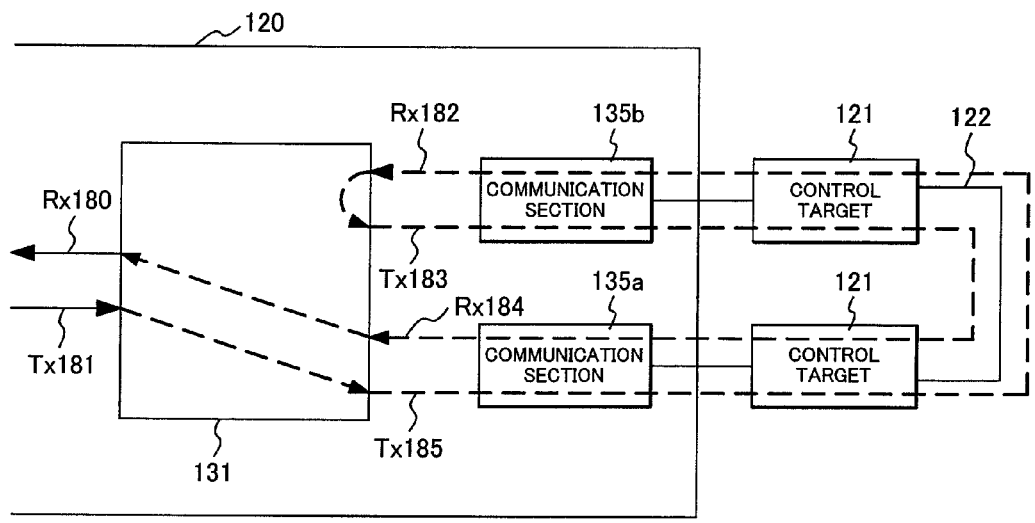
FIG. 10 shows a normal packet communication path.
Figure 11:
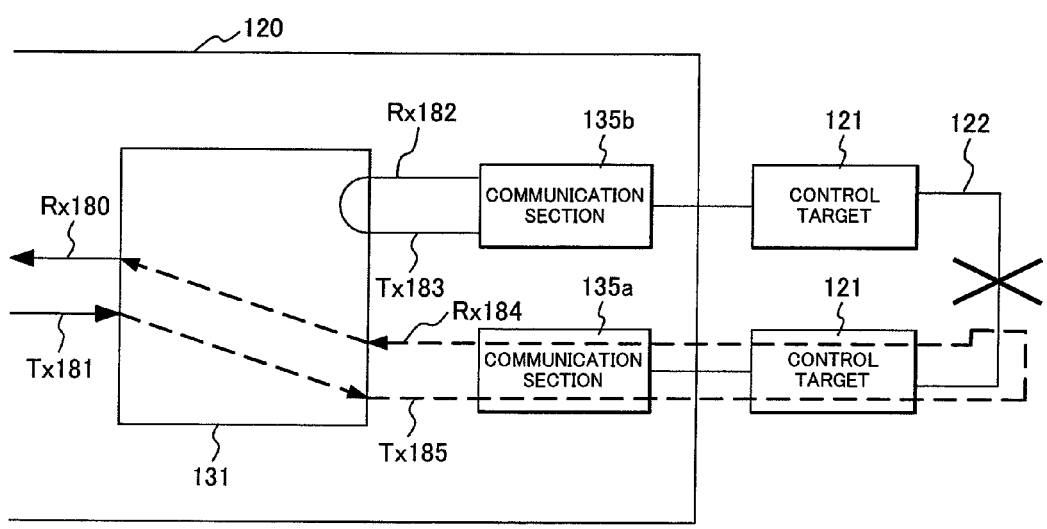
FIG. 11 shows an abnormal packet communication path.
Figure 12:
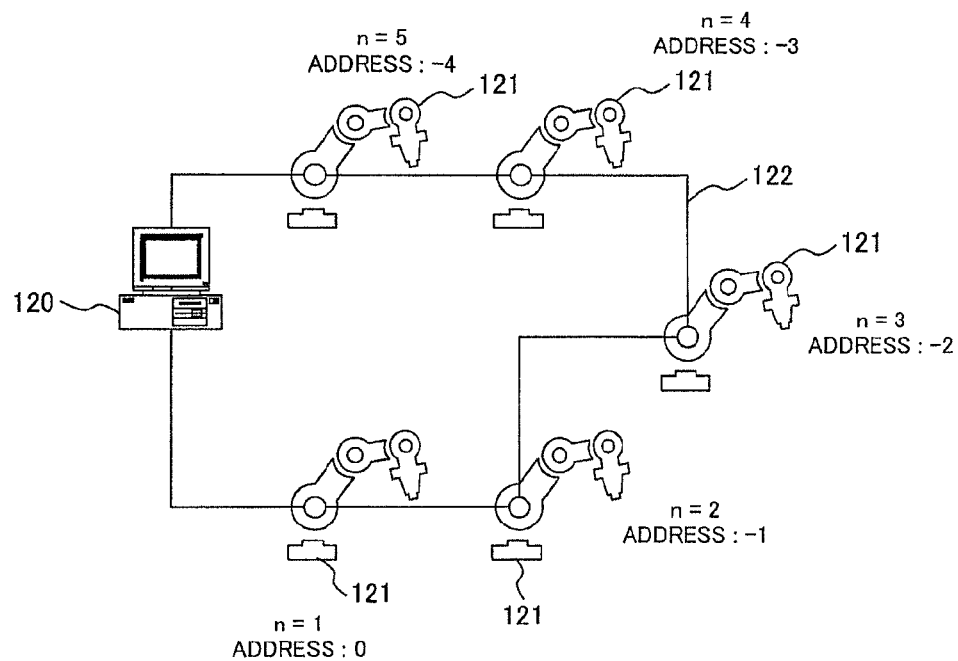
FIG. 12 shows a network state and auto-increment addresses.

FIG. 10 shows a normal communication path. FIG. 11 shows an abnormal communication path. When the communication path is normal as shown in FIG. 10, a packet transmitted from the redundant path switching section 131 is transferred to the communication section 135*a*, the control targets 121, and then the communication section 135*b*. The packet passes through the redundant path switching section 131 and is transferred to the communication sections 135*b*, the control targets 121, then the communication section 135*a*, and returns to the redundant path switching section 131.

As shown in FIG. 11, when the communication path is abnormal due to an error between the two control targets 121, a packet transmitted from the redundant path switching section 131 is transferred to the communication section 135*a* and returns to the redundant path switching section 131 in accordance with a path transfer function of the loopback function section in the control target 121 connected to the communication section 135*a*, for example. In short, when the communication path is abnormal, a packet transmitted from the redundant path switching section 131 returns to it without once passing through it As the first abnormality determination method, the abnormality determination section determines whether a packet is received from the communication section 135*a* before the redundant path switching section 131 receives a packet from the communication section 135*b*. The abnormality determination section determines the communication path to be abnormal when a packet is received by the communication section 135*a* and not by the communication section 135*b*. FIG. 11 shows the packet communication direction and omits the PHY 103.

(Second Abnormality Determination Method)

The second abnormality determination method supplies an EtherCAT frame with the BRD command issued to a register processed by all slaves and checks the working counter for that frame. The communication path is determined to be abnormal when a value of the working counter for the EtherCAT frame is smaller than the slave count that is acquired and verified in advance.

(Countermeasure Against a Communication Path Error)

Now returning back to the flowchart in FIG. 6, when no error may occur on the communication path (N at step S006), the EtherCAT communication continues (step S004). When the communication path abnormality determination section 133 determines that an error occurs on the communication path (Y at step S006), the operation management section 138 changes the internal state of the redundant path switching section 131 to the abnormal mode and establishes the internal path connection as shown in FIG. 9 (step S007).

According to the internal path in the abnormal mode shown in FIG. 9, the reception line Rx 182 at one of the communication ports transmits a packet to the reception line Rx 180 at the arithmetic section side. The transmission line Tx 181 at the arithmetic section side transmits a packet to the transmission line Tx 185 at the other communication port. The transmission line Tx 183 at the former communication port not connected to the arithmetic section is connected to the reception line Rx 184 at the latter communication port to loop a packet back to the control target 121.

The internal path of the redundant path switching section 131 is changed to the abnormal mode. At the same time, a communication means for the bus 110 is used to notify a program running on the CPU 101 that the internal path of the redundant path switching section 131 has been changed. The communication means for the bus 110 notifies an interrupt, for example. When receiving the notification, the program notifies a user or an operator that an error occurs on the communication path. The user or the operator can recover from the error by replacing a communication cable, for example.

(Method of Locating an Error Occurrence on the Communication Path)

Figure 13:
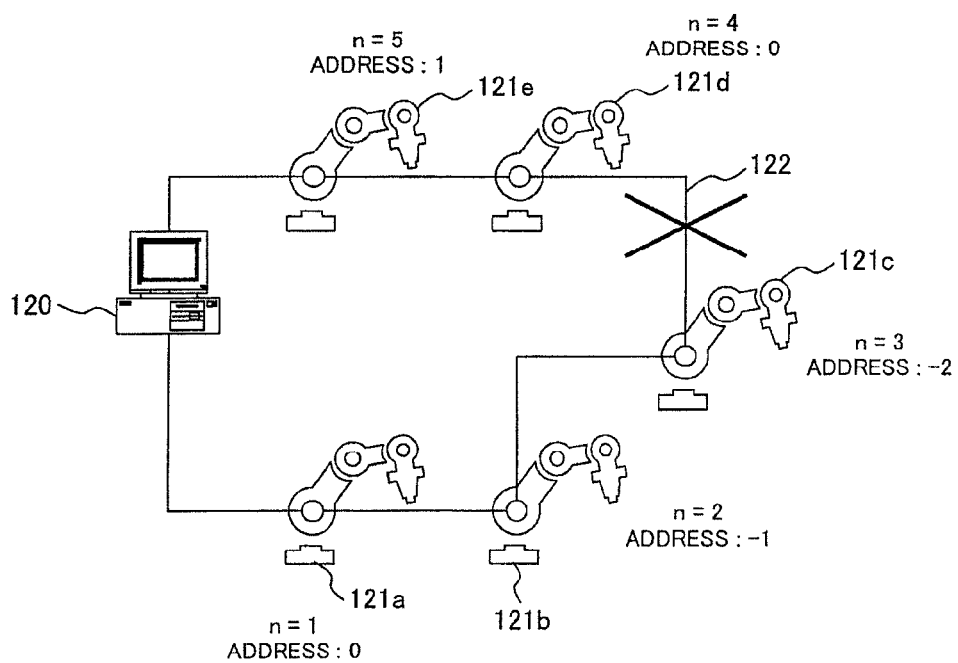
FIG. 13 shows a network state and auto-increment addresses.
Figure 14:
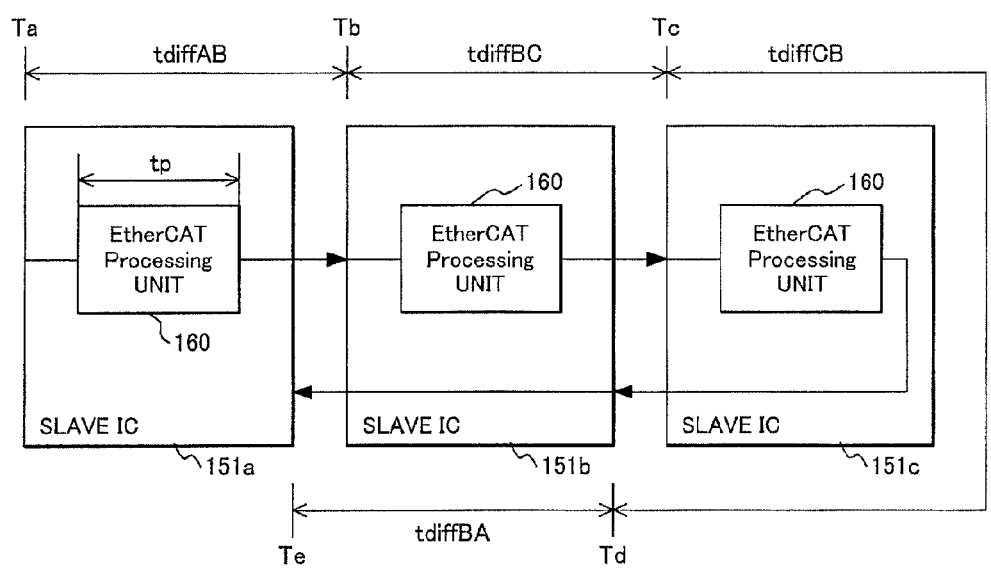
FIG. 14 shows a method of measuring a communication delay for the time synchronization.

The method uses a value of the working counter for the BRD command issued to a register processed by all slaves. As shown in FIG. 13, for example, a communication path error may occur between a slave 121*c* with address n set to 3 and a slave 121*d* with address n set to 4. In this case, the network is configured so that the third slave 121*c* loops back a packet. An EtherCAT telegram passes through the slaves 121*a*, 121*b*, and 121*c* with addresses n set to 1, 2, and 3, respectively, and sets its working counter to 3. It can be assumed that an error occurs on the communication path between the slaves 121*c* and 121*d*.

Alternatively, the method reads a lost link counter register for each communication port corresponding to each slave. The method assumes an error occurrence on the communication path connected to the communication port where a non-zero value is acquired. The lost link counter register needs to clear the register value by writing simultaneously with reading. The above-mentioned method notifies the operation management section 138 of the location of the communication path assumed to be abnormal and supplies the location to a program running on the CPU 101.

(First Normality Determination Method)

Now returning back to the flowchart in FIG. 6, the redundant path switching section 131 may operate in the abnormal mode (N at step S005). In this case, the communication path normality determination section 134 determines whether the communication path recovers from the error (step S008).

The first normality determination method determines whether the communication section 135*b* receives a packet after the communication section 135*a* transmits a packet. As shown in FIG. 10, the communication path normality determination section 134 determines the communication path to be normal when verifying that the communication section 135*b* receives a packet before the communication section 135*a* receives a packet.

(Second Normality Determination Method)

The second normality determination method supplies an EtherCAT frame with the BRD command issued to a register processed by all slaves and checks the working counter. The communication path is determined to be normal when the value of the working counter for the EtherCAT frame at the first receiving communication section 135 equals the slave count that is acquired and verified in advance. For example, the communication path is determined to be normal when the communication section 135a transmits a packet and then the communication section 135b receives a packet and when the working counter value for the EtherCAT frame equals the slave count that is acquired and verified in advance.

Alternatively, the communication path is determined to be normal when the communication section 135a transmits a packet and then receives a packet and when the working counter value for the EtherCAT frame equals the slave count that is acquired and verified in advance. In the latter case, however, an error may occur on the communication path connected to the communication section 135b. The method may determine an error occurrence instead of determining the communication path connection in the normal mode shown in FIG. 8.

When the communication path does not recover from the error (N at step S008), the EtherCAT communication continues (step S004). When the communication path recovers from the error (Y at step S008), the redundant path switching section 131 changes the internal state to the normal mode and configures the internal path connection as shown in FIG. 8 (step S009). At the same time, the communication means for the bus 110 is used to notify the program running on the CPU 101 that the internal state has been changed. The program then notifies the recovery state of the communication path to a user or an operator. The user or the operator can confirm the recovery state.

The EtherCAT communication in the normal or abnormal mode terminates when the CPU 101 issues an instruction to terminate the EtherCAT communication (step S010). In FIG. 6, the process verifies the presence or absence of a termination instruction after the redundant path is changed. The presence or absence of the termination instruction may be verified at any timing. For example, the presence or absence of the termination instruction may be verified before step S004.

Effects of the Embodiment

When an error occurs on the communication path, the control target 121 nearest to the error location can loop back a packet in the control network system using the control computer 120 according to the embodiment. The redundant path switching section 131 can change the internal communication path to form a network based on logical topology by avoiding the error location without the need for software processing. Accordingly, the control computer 120 can transfer packets with a specified delay and perform a time synchronization algorithm even when an error occurs on the communication path.

When a command needs to be transmitted to the logical address, packets need not be transmitted to respective portions of the network disconnected by a communication path error. A single packet is transferred over the ring network so as to configure a communication path that loops back in the redundant communication control section 102.

Accordingly, the telegram stores an expected correct result even when different slaves are allocated to portions of the disconnected network in accordance with the mapping of the logical address space. The sequence of the control targets 121 is unchanged in the control network using the control computer 120 according to the embodiment. The auto-increment addresses need not be changed.

Figure 15:
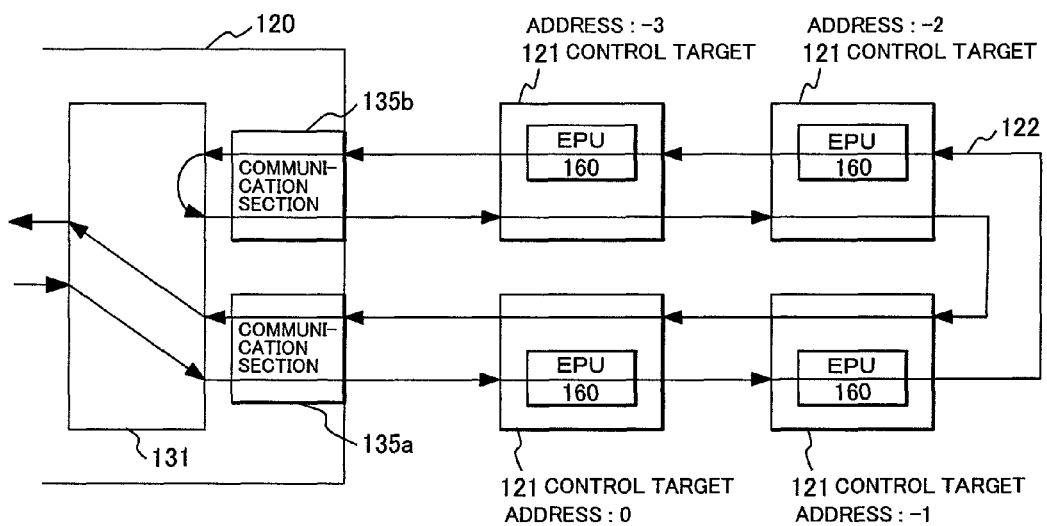
FIG. 15 shows a network state and auto-increment addresses.

FIG. 15 shows auto-increment addresses for the control targets in the normal mode. In FIG. 15, a solid line indicates the communication path for an EtherCAT frame. Two communication ports are effective for the control target 121. As shown in FIG. 15, the auto-increment address is incremented each time the EtherCAT frame passes through the EPU 160.

Figure 16:
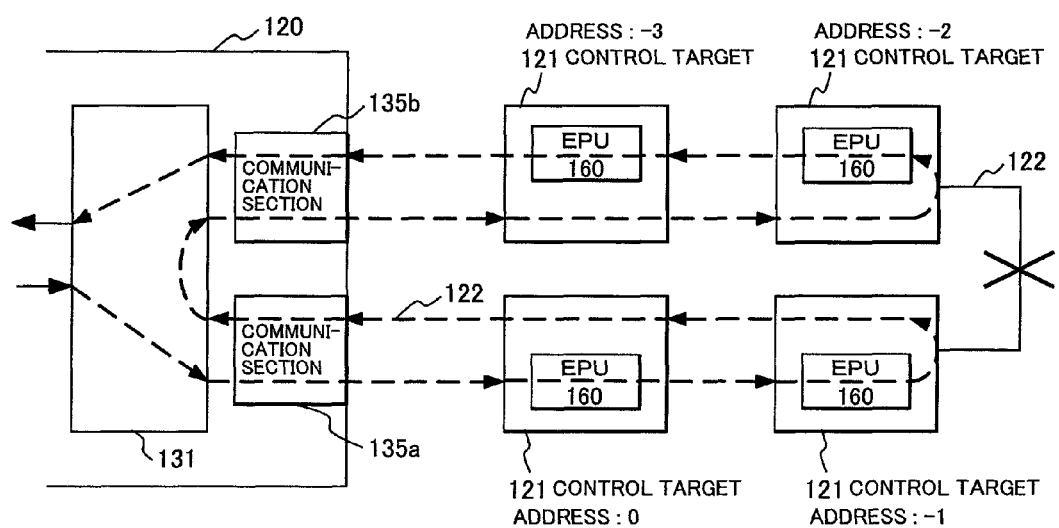
FIG. 16 shows a network state and auto-increment addresses.

FIG. 16 shows auto-increment addresses for the control targets in the abnormal mode. In FIG. 16, a broken line indicates the communication path where an error occurs. As shown in FIG. 16, the abnormal mode does not change the sequence of EPUs 160 the EtherCAT frame passes through. Therefore, auto-increment addresses are specifiable similarly to the normal mode.

Initialization of the redundant communication control section 102 is only an additional process to the development of the software installed in the control computer 120. The redundant communication control section 102 automatically processes a redundancy operation such as switching the internal paths in accordance with communication path states. Accordingly, the software just needs to be developed so as to comply with the single communication port similar to a conventional technology. It is possible to reduce a burden on software development for a redundant network.

As mentioned above, the control computer 120 according to the embodiment can ensure the highly reliable real-time communication.

[Second Embodiment]

Figure 18:
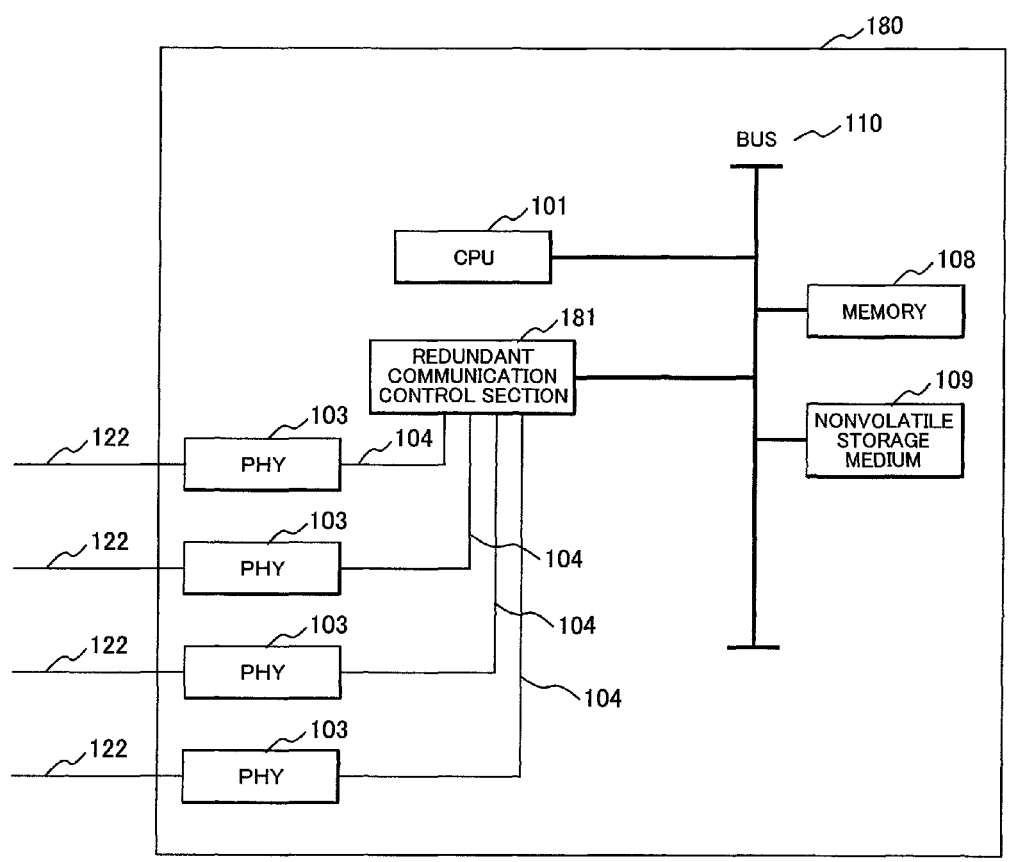
FIG. 18 is a block diagram showing the hardware configuration of a control computer according to the second embodiment.
Figure 19:
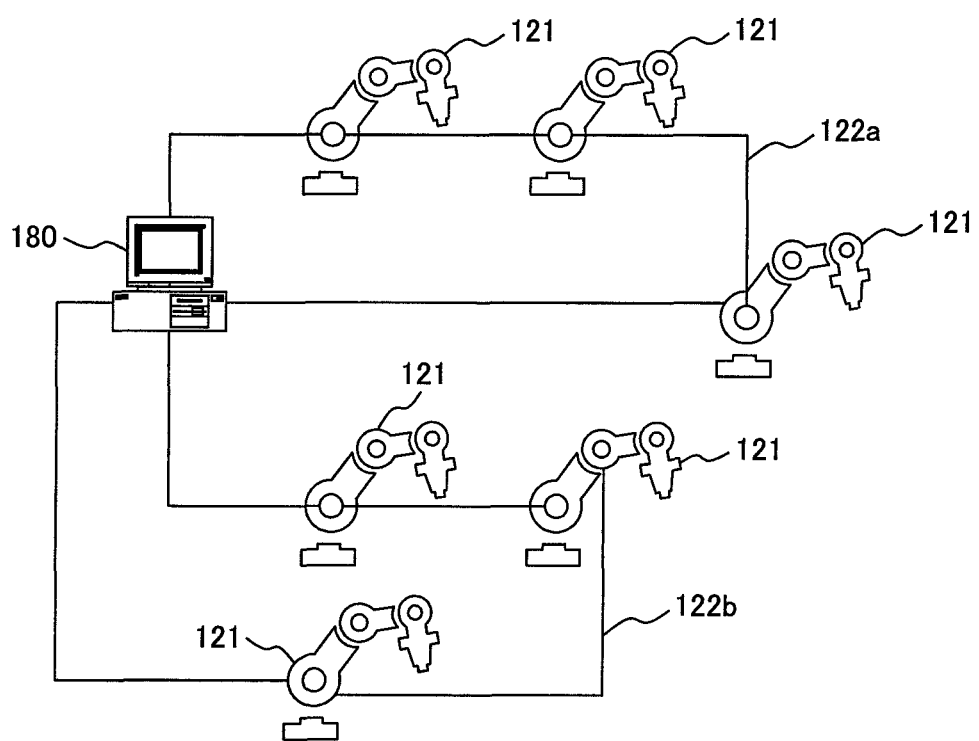
FIG. 19 is a schematic diagram showing the configuration of the control network system using the control computer shown in FIG. 18.

The second embodiment will be described. FIG. 18 is a block diagram showing the hardware configuration of a control computer 180 according to the embodiment. FIG. 19 is a schematic diagram showing the configuration of the control network system using the control computer 180 shown in FIG. 18. As shown in FIGS. 18 and 19, the control computer 180 according to the embodiment includes four communication ports. The control computer 180 configures a control network having two ring networks 122a and 122b in each of which two communication ports are physically connected to each other.

Figure 17:
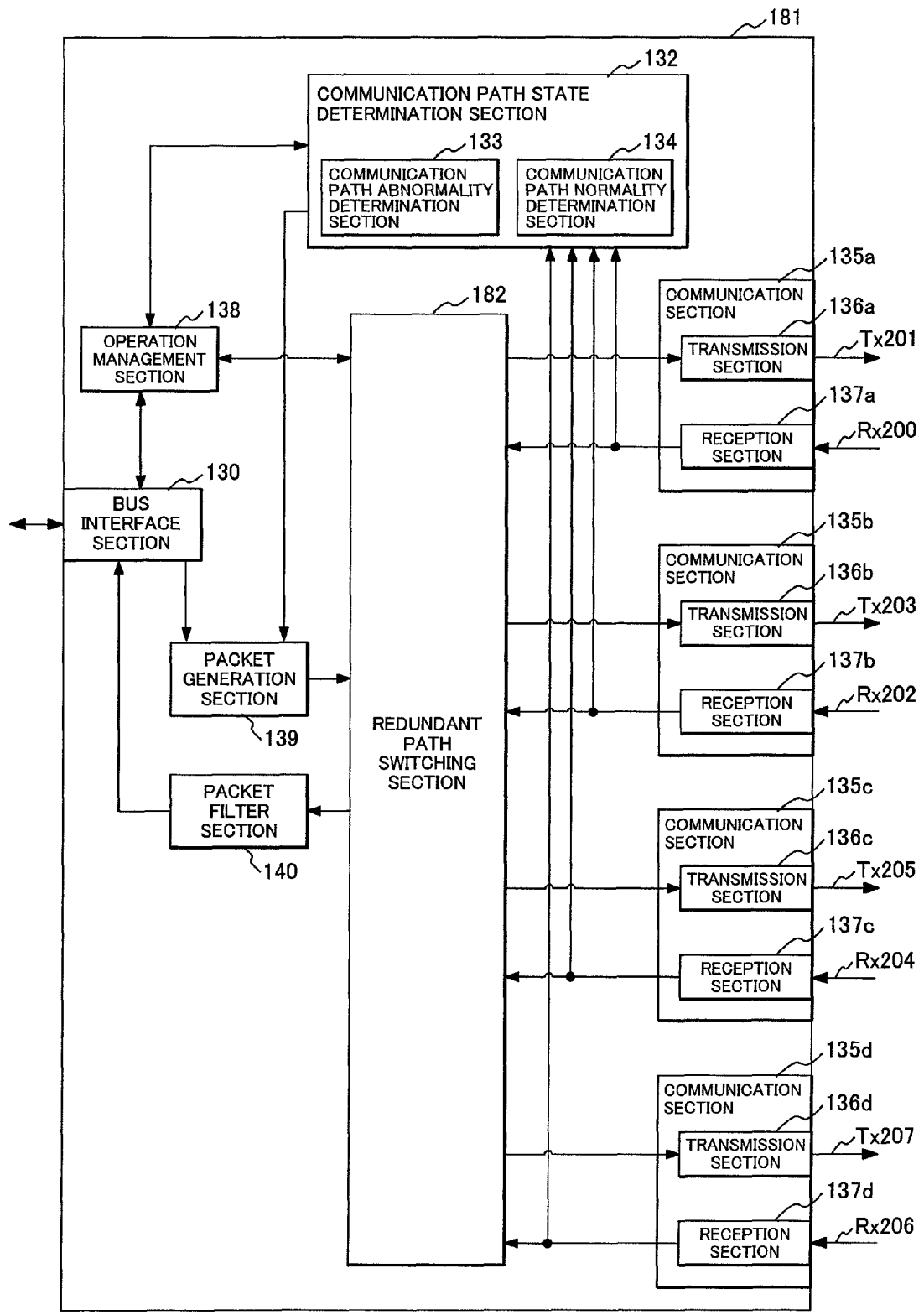
FIG. 17 is a block diagram showing the function configuration of a redundant communication control section according to a second embodiment of the invention.

FIG. 17 is a block diagram showing the function configuration of a redundant communication control section 181 according to the embodiment. Unless otherwise specified, the mutually corresponding components or functions in FIGS. 17 and 3 are designated by the same reference numerals. As shown in FIG. 17, the redundant communication control section 181 according to the embodiment differs from the redundant communication control section 102 in FIG. 3 in that four communication sections 135a, 135b, 135c, and 135d are provided.

(Logical Communication Section)

The communication section 135a is a communication port that transmits a packet from the packet generation section 139. The communication section 135a includes the transmission section 136a and the reception section 137a that are connected to a transmission line Tx 201 and a reception line Rx 200, respectively. The communication section 135b is a communication port that receives packets from the communication section 135a and the last EtherCAT slave included in the control network 122a. The communication section 135b includes the transmission section 136b and the reception section 137b that are connected to a transmission line Tx 203 and a reception line Rx 202, respectively.

The communication section 135c is a communication port that transmits a packet received by the communication section 135b to the control network 122b. The communication section 135c includes a transmission section 136c and a reception section 137c that are connected to a transmission line Tx 205 and a reception line Rx 204, respectively. The communication section 135d is a communication port that receives packets from the communication section 135c and the last EtherCAT slave included in the control network 122b. The communication section 135d includes a transmission section 136d and a reception section 137d that are connected to a transmission line Tx 207 and a reception line Rx 206, respectively.

Instructions from the operation management section 138 form communication paths as shown in FIGS. 21 through 25 using the transmission lines Tx 201, 203, 205, and 207 and the reception lines Rx 200, 202, 204, and 206 in the redundant path switching section 182.

(Association Between Physical and Logical Communication Sections)

Physical positions of the communication sections may be statically associated with the functional communication sections 135a through 135d. Alternatively, a given communication section may first transmit a packet. The other communication sections may receive the packet and may be associated with the communication sections 135b through 135d in order. The association method will be described with reference to FIG. 20.

Figure 20:
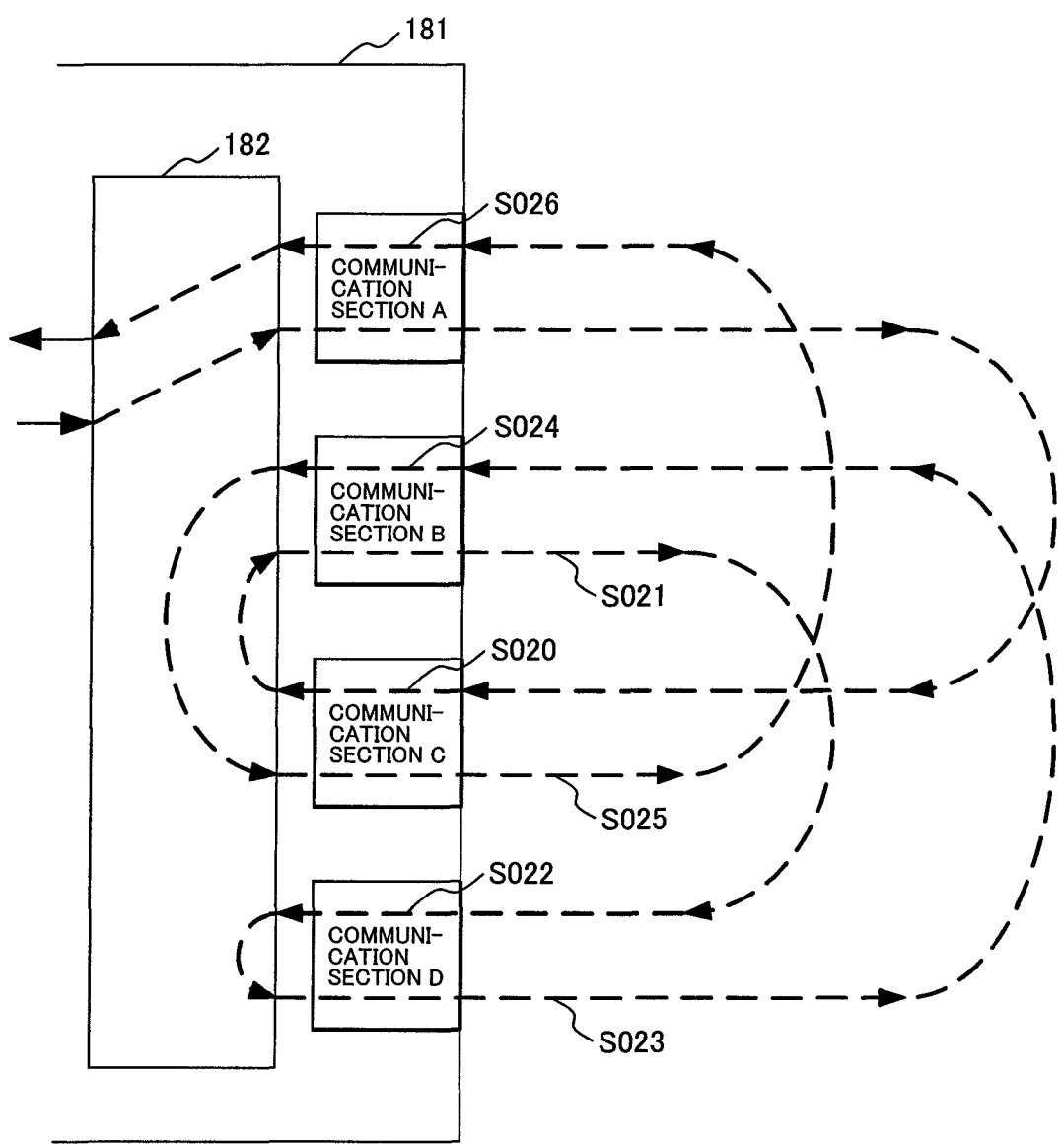
FIG. 20 shows function correspondence of a communication section in the redundant communication control section shown in FIG. 17.

As shown in FIG. 20, for example, let us suppose that the communication section A first transmits a packet to the communication sections A, B, C, and D whose physical positions are known. The communication section A is assumed to be the communication section 135a shown in FIG. 17. The communication section C receives the packet (step S020) and is assumed to be the communication section 135b shown in FIG. 17. The communication section C transfers the received packet to either of the remaining communication ports. In this example, the communication section C selects the communication section B and transfers the packet to it (step S021).

The communication section B is then assumed to be the communication section 135c in FIG. 17. The communication section D then receives the packet (step S022) under the condition that the network wiring is correct. Since the redundant path switching section 182 is wired as shown in FIG. 20, the communication section D transmits the packet received by itself (step S023). The communication section D is assumed to be the communication section 135d in FIG. 17. As mentioned above, a packet is transmitted and received to keep track of the reception sequence on the basis that the network is correctly wired. In this manner, the physical communication sections A through D can be associated with the logical communication sections 135a through 135d.

This scheme can be used to detect whether the ring network is established. The network may not be established when the wiring is incorrect or an error occurs on the communication path. For example, let us suppose that the communication section A first transmits a packet and then receives it for itself. In this case, it can be determined that the network connected to the communication section A is configured as a line topology or an error occurs on the network connected to the communication section A. The operation management section 138 can notify the detected information to a program running on the CPU 101. The user or the operator then can take action such as confirming the communication cable connection or replacing the communication cable.

(Dynamic Sequence)

The process of the redundant communication control section 181 according to the embodiment is basically the same as that shown in FIG. 6. Differences are the normal mode setting at step S001, the method of determining communication path states at steps S006 and S008, and the changeover of the redundant path at steps S007 and S009. The communication path state is checked in each of the control networks 122a and 122b.

Figure 21:
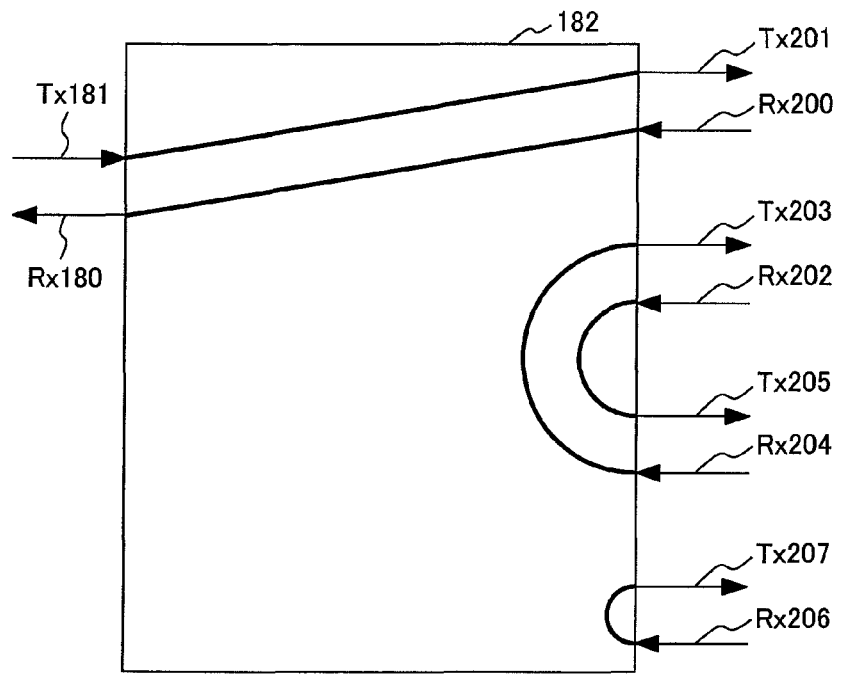
FIG. 21 exemplifies a communication path in normal mode for a function section according to the second embodiment.
Figure 25:
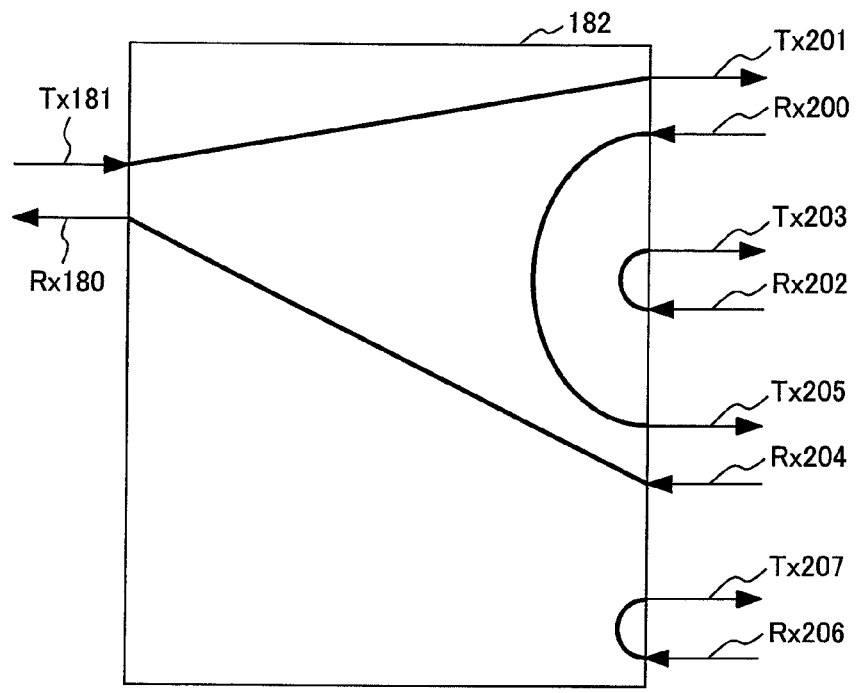
FIG. 25 exemplifies a communication path in normal mode for the function section according to the second embodiment.

The normal mode setting at step S001 assumes that the communication path connection state for the redundant path switching section 182 is configured as shown in FIG. 21 or 25.

(First Abnormality Determination Method)

The first abnormality determination method at step S006 determines whether the communication section 135a receives a packet after the communication section 135a transmits the packet and before the communication section 135b receives the packet. The method determines an error occurrence on the communication path for the control network 122a when the communication section 135b does not receive the packet and the communication section 135a receives it.

Similarly, the method determines whether the communication section 135c receives a packet after the communication section 135c transmits the packet and before the communication section 135d receives the packet. The method determines an error occurrence on the communication path for the control network 122b when the communication section 135d does not receive the packet and the communication section 135c receives it.

(Second Abnormality Determination Method)

The second abnormality determination method supplies an EtherCAT frame with the BRD command issued to a register processed by all slaves and checks the working counter for that frame. The communication path is determined to be abnormal when a value of the working counter for the EtherCAT frame is smaller than the slave count that is acquired and verified in advance. In this case, it is necessary to previously acquire the number of slaves connected to each of the control networks 122a and 122b.

Let us assume the number of slaves connected to the control network 122a to be Na and the number of slaves connected to the control network 122b to be Nb. The method determines at least the communication path for the control network 122a to be abnormal when the working counter value for the EtherCAT frame is smaller than Na. The method determines the communication path for the control network 122b to be abnormal when the working counter value is greater than Na and is smaller than Nb.

(First Normality Determination Method)

The first normality determination method at step S008 determines whether the communication section 135a transmits a packet, the communication section 135b receives the packet, and then the communication section 135a receives the packet. The method determines the communication path to be normal when the communication section 135b receives the packet and then the communication section 135a receives it. Similarly, the method determines whether the communication section 135c transmits a packet, the communication section 135d receives the packet, and then the communication section 135c receives the packet. The method determines the communication path for the control network 122b to be normal when the communication section 135d receives the packet and then the communication section 135c receives it.

(Second Normality Determination Method)

The second abnormality determination method supplies an EtherCAT frame with the BRD command issued to a register processed by all slaves and checks the working counter for that frame. The communication path is determined to be abnormal when a value of the working counter for the EtherCAT frame equals the slave count that is acquired and verified in advance.

When the internal path for the redundant path switching section 182 is configured as shown in FIG. 25, the communication path for the network 122a is determined to be normal when the working counter for the EtherCAT frame received by the communication section 135a equals the number of slaves Na for the ring network 122a. The communication path for the network 122b is determined to be normal when the working counter for the EtherCAT frame received by the communication section 135c equals the number of slaves Nb for the ring network 122b.

(Path Connection State of the Redundant Path Switching Section)

Figure 26:
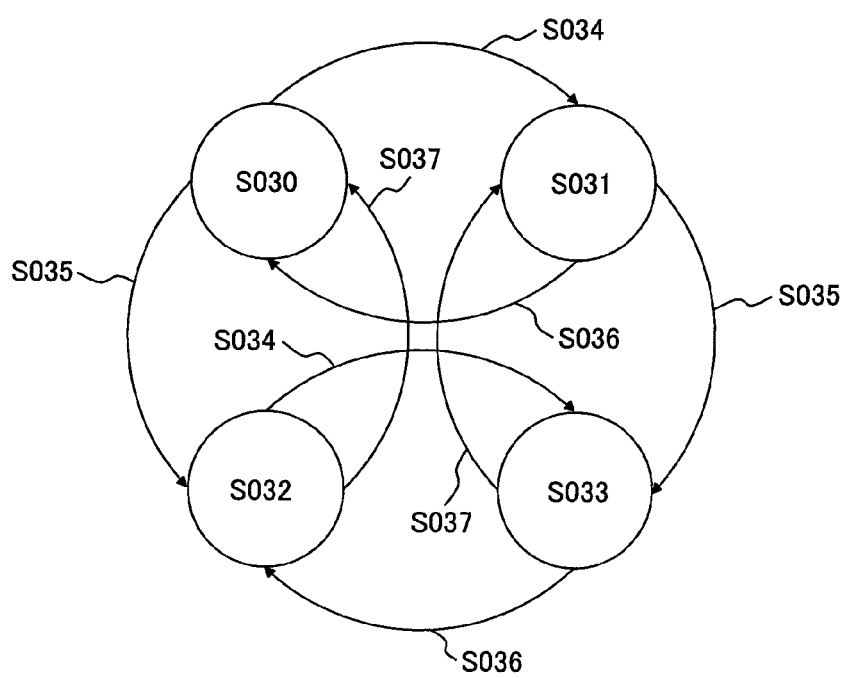
FIG. 26 shows connection state transition of the redundant path switching section.

The communication path connection states at steps S007 and S009 inside the redundant path switching section 182 depend on states of the communication paths for the two ring networks 122a and 122b. With reference to FIG. 26, the following describes how the operation management section 138 controls the changeover of the connection states inside the redundant path switching section 182.

Figure 22:
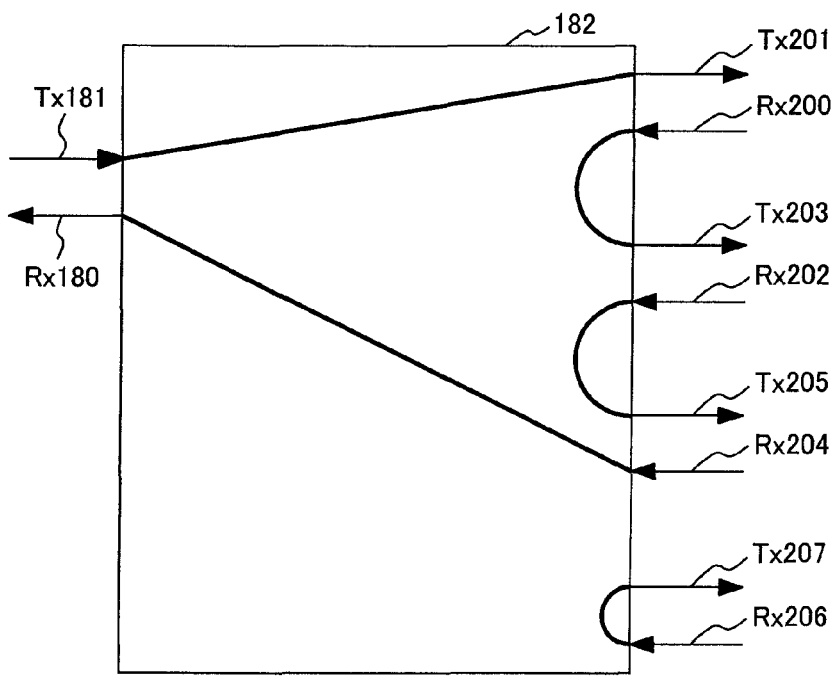
FIG. 22 exemplifies a communication path in abnormal mode for the function section according to the second embodiment.
Figure 23:
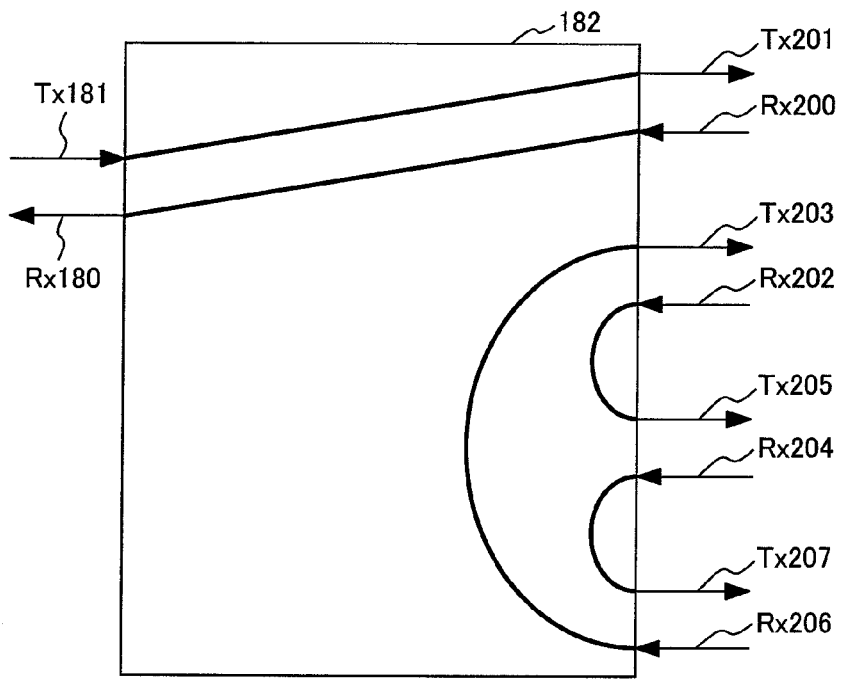
FIG. 23 exemplifies a communication path in abnormal mode for the function section according to the second embodiment.
Figure 24:
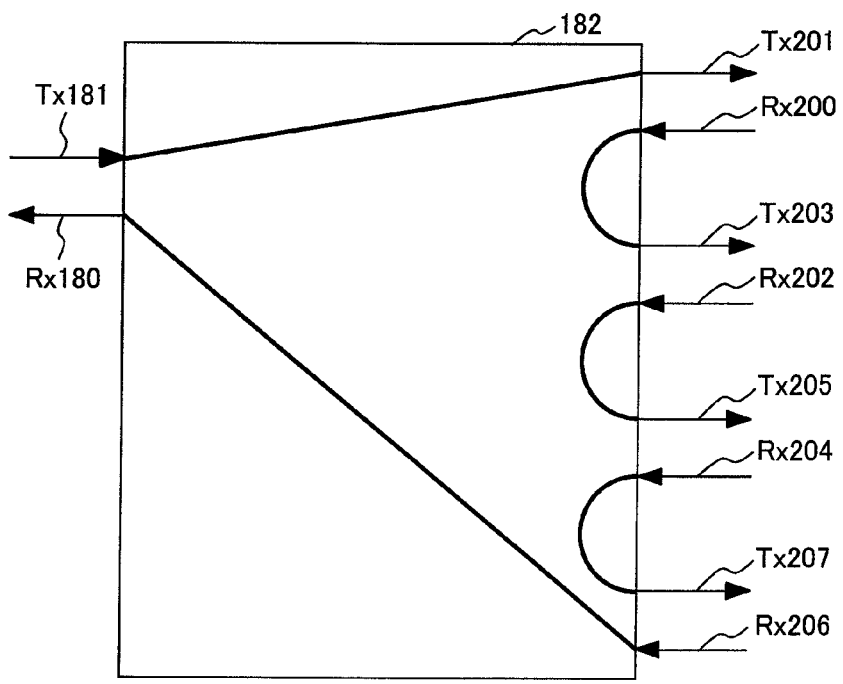
FIG. 24 exemplifies a communication path in abnormal mode for the function section according to the second embodiment.

FIG. 26 shows connection state transition inside the redundant path switching section 182. In FIG. 26, S030 denotes the normal mode. S031 denotes a state in which only one ring network 122a is abnormal. S032 denotes a state in which only the other ring network 122b is abnormal. S033 denotes a state in which both networks 122a and 122b are abnormal. The redundant path switching section 182 contains the communication path as shown in FIG. 21 or 25 for S030, that as shown in FIG. 22 for S031, that as shown in FIG. 23 for S032, and that as shown in FIG. 24 for S033.

An event S034 as a transition condition determines the ring network 122a to be abnormal. S035 determines the other ring network 122b to be abnormal. S036 determines the ring network 122a to be normal. S037 determines the other ring network 122b to be normal.

(Effects)

Using four communication sections 135, the control computer 180 according to the embodiment can continue EtherCAT-based real-time communication even when an error occurs on the communication path in the two physical ring networks 122a and 122b.

Similarly to the first embodiment, the control computer according to the embodiment can improve the reliability of the redundant real-time communication even for a control network configured to use more than two communication ports.

While the embodiment uses the four communication sections 135a through 135d, the same effect is available to more than four communication sections. When an odd number of communication sections are used, the network connected to one communication section forms a line topology. A ring network is formed for every two of the even number of the remaining communication sections to provide the effect of the invention.

[Third Embodiment]

Figure 28:
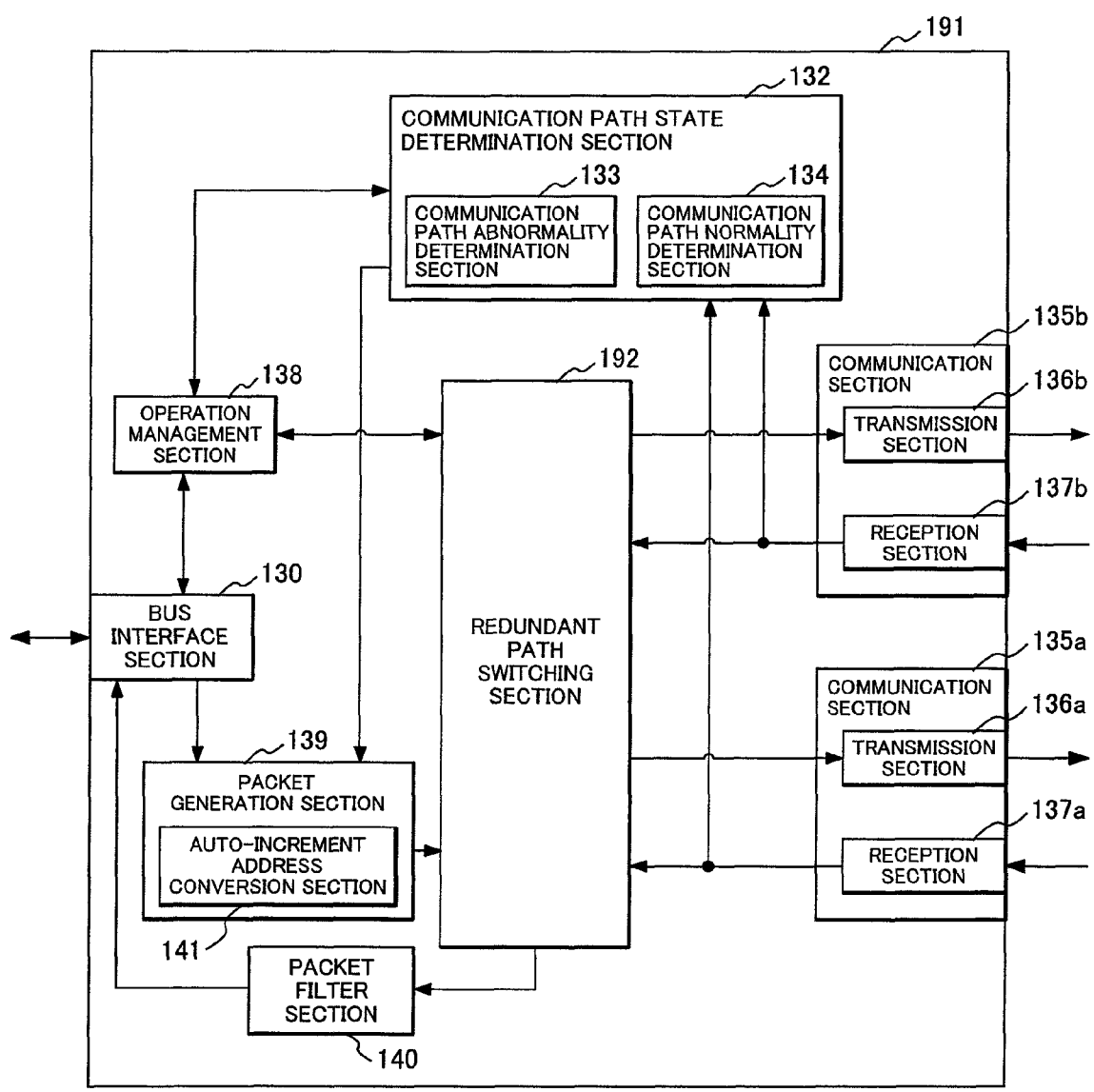
FIG. 28 is a block diagram showing the function configuration of the redundant communication control section according to a third embodiment of the invention.

The third embodiment will be described. FIG. 28 exemplifies a hardware configuration of the redundant communication control section 191 provided for the control computer according to the embodiment. Unless otherwise specified, the mutually corresponding components or functions in FIGS. 28 and 3 are designated by the same reference numerals. The control computer including the redundant communication control section in FIG. 28 uses the same hardware configuration as that in FIG. 2.

As shown in FIG. 28, the redundant communication control section 191 differs from the redundant communication control section 102 in that an auto-increment address conversion section is provided in the packet generation section. An auto-increment address conversion section 141 converts an auto-increment address in a command issued to it in accordance with communication path states.

The control network system using the control computer according to the third embodiment is the same as that of the first embodiment except conditions for the operation management section 138 to change the communication path connection state of the redundant path switching section 192 and the determination procedure for the communication path state determination section 132. The third embodiment assumes two or more error occurrences on the communication path. The control computer according to the embodiment uses the same hardware configuration as that in FIG. 2.

Figure 27:
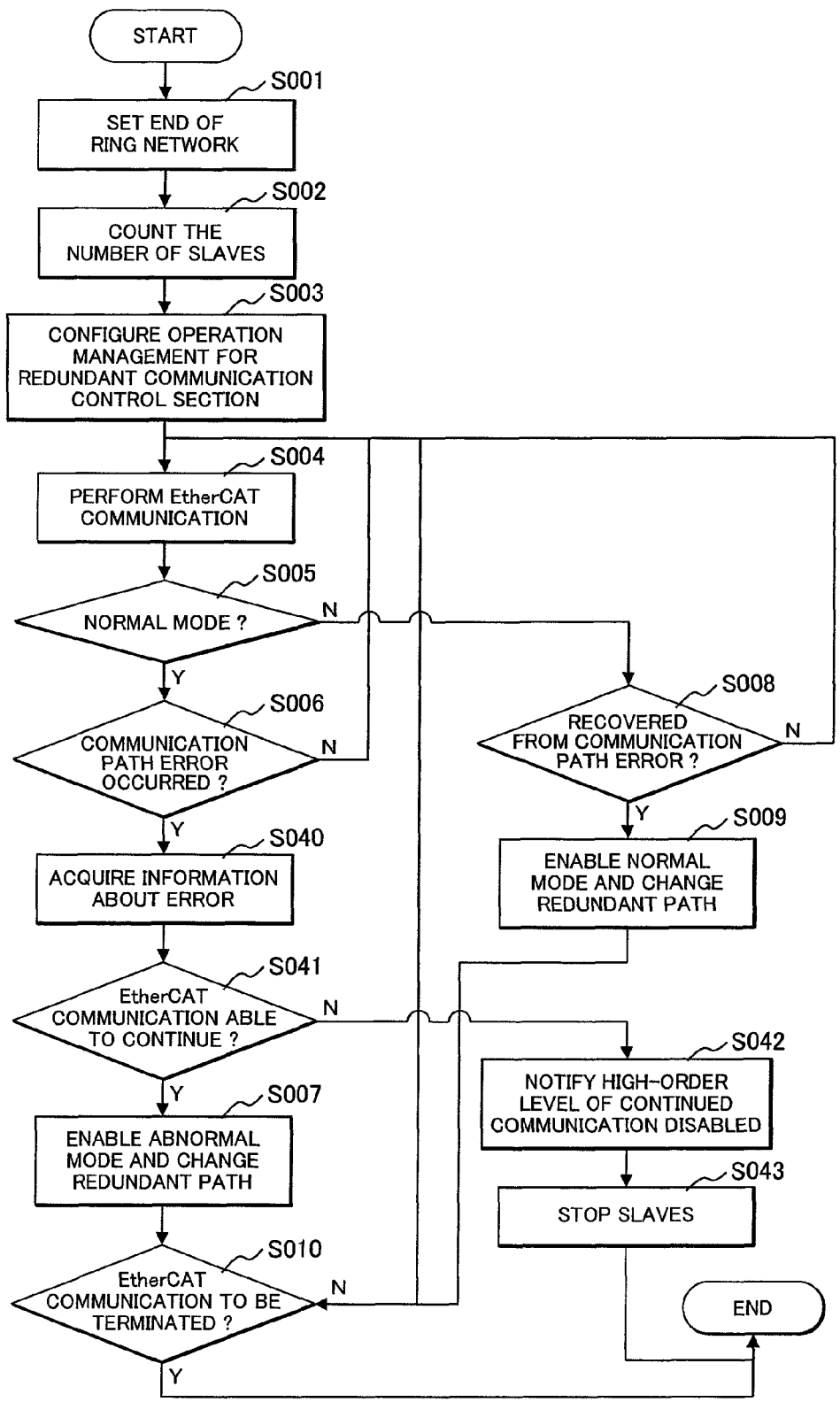
FIG. 27 is a flowchart showing a process of the redundant path switching section.

FIG. 27 is a flowchart showing a process of the redundant communication control section 191. Differences from the process shown in FIG. 6 for the redundant communication control section are steps S003, S040, S041, S042, and S043. Step S008 is followed by a different response to the negative result of the determination whether the communication path recovers from the error.

At step S003, the process configures the operation management for the redundant communication control section 191. A program running on the CPU 101 specifies conditions for the operation management section 138 to enable continued EtherCAT communication. For example, conditions to be specified include the number of slaves capable of normal communication and the identifier of a slave capable of continued EtherCAT communication even when the communication is impossible.

When the communication path is determined to be abnormal at step S006, the process acquires information about the error at step S040. The information to be acquired includes a location of the communication path where the error occurs, for example. The third embodiment assumes two or more errors on the communication path.

(Method of Acquiring an Error Occurrence Location)

Figure 29:
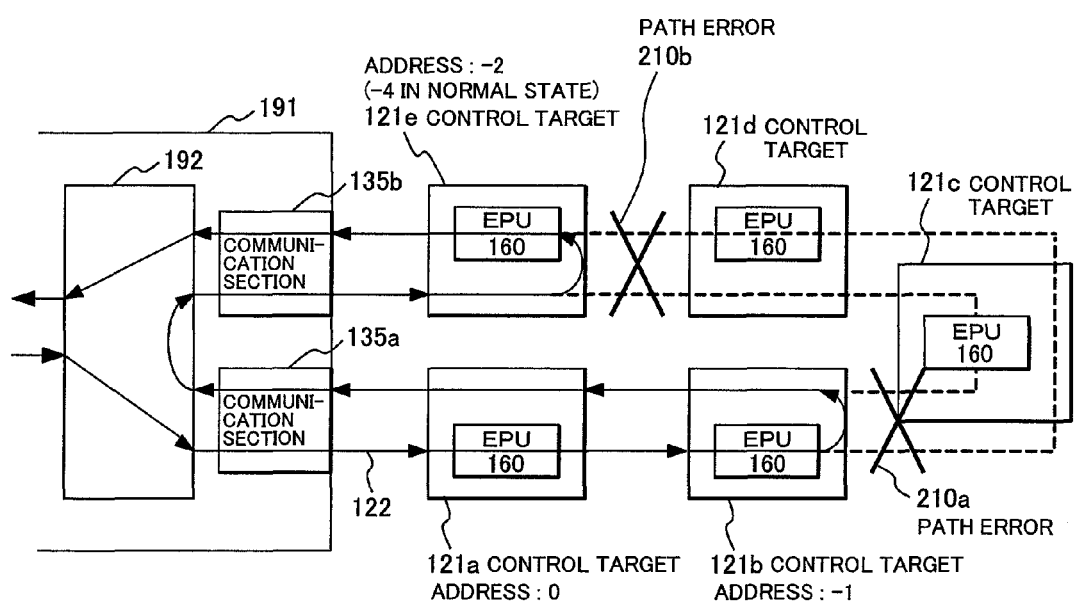
FIG. 29 shows a network state according to the third embodiment.

FIG. 29 illustrates a method of locating two error occurrences on the control network. FIG. 29 shows error occurrences on the communication path between the control targets 121b and 121c and on the communication path between the control targets 121d and 121e.

The method first supplies an EtherCAT frame with the BRD command issued to a register processed by all slaves. When an error occurs on one or more communication paths, the communication section 135a receives a packet before the communication section 135b receives a packet. The method detects an error occurrence on the communication path based on this packet reception order and checks the working counter for the BRD command received by the communication section 135a.

Working counter value Wa reflects the number of slaves Na up to a path error 210a nearest to the communication section 135a. According to the example in FIG. 29, the working counter is set to 2. Based on the working counter value set to 2, the method can determine the location of the path error 210a between the control targets 121b and 121c.

The redundant path switching section 192 loops the packet received by the communication section 135a back to the communication section 135b. The communication section 135b again receives that packet. The method can determine one error occurrence on the communication path when the working counter value Wb for the BRD command equals the slave count N that is acquired and verified in advance. The method can determine two error occurrences on the communication path when Wb is smaller than N.

According to the example in FIG. 29, Wb is set to 3. A difference between Wb and Wa reflects the number of slaves Nb that are found between the communication section 135b and a path error 210b nearest to the communication section 135b. According to the example in FIG. 29, a difference between Wb and Wa is expressed as 3−2=1. Accordingly, the method determines the location of the path error 210b on the communication path between the control targets 121e and 121d.

In FIG. 27, the process determines whether the EtherCAT communication can continue (step S041) based on the information acquired at step S040 and the condition configured at step S003 for enabling the continued communication. One example of the condition for enabling the continued communication may be the minimum number of slaves Nc1 capable of the communication. In this case, it is determined that the EtherCAT communication can continue when the sum of Na and Nb is Nc1 or more.

Another example of the condition for enabling the continued communication may be the maximum number of slaves Nc2 incapable of communication. In this case, it is determined that the EtherCAT communication can continue when a difference, found by subtracting Na and Nb from the previously acquired and verified slave count N, is Nc2 or smaller.

Yet another example of the condition for enabling the continued communication may be that the EtherCAT communication can continue even when the communication is disabled for a slave with its auto-increment address set to A in the normal state. In this case, the process can locate an error occurrence on the communication path at step S040. The process can determine whether the communication is enabled for the slave with address A. Based on this information, the process determines whether the EtherCAT communication can continue.

At step S041, the process may determine that the EtherCAT communication cannot continue. In this case, the process notifies this determination result to the program running on the CPU 101 (step S042). An example of the notification method is an interrupt.

At step S043, the operation management section 138 issues a stop command to all communicable slaves to stop the system. At step S043, instead of the operation management section 138, the program running on the CPU 101, notified at step S042, may issue the command to stop the slaves. The slave needs to be preconfigured so as to be able to stop operations using a feature such as a watchdog timer when the communication with the master is disabled for a specified period of time.

(Auto-Increment Address Conversion)

When two or more errors occur on the communication path, the auto-increment addresses change as shown in FIG. 29. The control target 121e is assigned auto-increment address −4 in the normal state so as to represent the control target 121e as the fifth slave. When the communication path errors 210a and 210b occur as shown in FIG. 29, the control target 121e changes its auto-increment address to −2 to represent itself as the third slave. In order to prevent the program running on the CPU 101 from being aware of this change, the auto-increment address conversion section 141 changes the auto-increment address in the EtherCAT telegram based on the communication path errors.

Auto-increment address An for the nth slave (n=1 for the first slave) is represented as follows for the normal communication path using previously acquired and verified slave count N, slave count Na capable of communication with the communication section 135a, and slave count Nb capable of communication with the communication section 135b.

$$An = -n+1, \text{ where } n <= Na$$

$$An = -Na+1-(n-(N-Nb)), \text{ where } n > N-Nb$$

$$An = \text{communication disabled, where } Na < n <= N-Nb$$

When the address indicates a slave incapable of communication (Na<n<=N−Nb), the auto-increment address conversion section 141 notifies the program running on the CPU that the communication is disabled. An example of the notification method is an interrupt.

For example, FIG. 29 shows that the path error 210a occurs between the control targets 121b and 121c and the path error 210b occurs between the control targets 121d and 121e. In this case, the slave counts are N=5, Na=2, and Nb=1. The second slave (n=2) is conditioned to be 2<=Na and changes its address A2 to −2+1=−1. The fifth slave (n=5) is conditioned to be 5>N−Nb and changes its address A5 to −2+1−(5−(5−1))=−2.

(Three or More Communication Path Errors)

While the embodiment notifies at least two communication path errors, the precise number of communication path errors is unknown. However, the precise number of communication path errors is unnecessary because the ability to communicate with an EtherCAT slave determines the ability to continue the EtherCAT communication.

When the communication path state is not recovered at step S008 of this embodiment, the process determines at step S006 whether a communication path error occurs. This determination is used because a communication path error occurs and another is likely to occur.

The embodiment can continue the system operation as long as the EtherCAT communication can continue even when two or more communication path errors occur. When the EtherCAT communication becomes unable to continue, the redundant communication control section 191 or the program running on the CPU 101 notified of this state by the redundant communication control section 191 can appropriately stop the system. That is, the redundant scheme ensures the highly reliable real-time communication.

What is claimed is:

1. An information processor for controlling at least one control target via a network, the information processor comprising:
   an arithmetic section;
   at least two communication sections each including a transmission section for transmitting packet to the network and a reception section for receiving a packet from the network;
   a redundant communication control section that is provided between the arithmetic section and the communication section and controls a communication path,
   wherein the arithmetic section transmits an instruction value for the control target to the redundant communication control section and receives a result of communication with the control target from the redundant communication control section;
   wherein the communication section transmits a communication content received from the redundant communication control section to the control target via the network and transmits a result received from the control target to the redundant communication control section;
   wherein the redundant communication control section includes:
   a communication path state determination section for determining a path state of the network;
   a redundant path switching section for switching connection between the arithmetic section and at least the two communication sections;
   wherein the network for connecting at least the one control target with the communication section provides a logical ring topology;
   wherein the redundant path switching section functions based on the communication path state determined by the communication path state determination section and changes a connection path between the communication sections and a communication path between the communication section and the arithmetic section to communication paths having different logical ring topologies wherein the control target includes a loopback function section for changing a transfer destination of the packet when an error occurs on a communication path between the information processor and one of a communication section and another control target wherein the communication path state determination section includes:

a communication path abnormality determination section for determining abnormality on a communication path for the network;

a communication path normality determination section for determining normality on a communication path for the network wherein the communication path abnormality determination section supplies a packet with a communication content incremented by a specified value when the number of the control targets connected to the network is known and all the control targets complete reception;

wherein the communication path abnormality determination section determines a communication path to be abnormal when the number of the control targets differs from the number of the control targets found based on a value of a communication content supplied to a packet during packet reception, wherein the communication path normality determination section supplies a packet with a communication content incremented by a specified value when the number of the control targets connected to the network is known and all the control targets complete reception; and wherein the communication path normality determination section determines a communication path to be normal when the number of the control targets matches the number of the control targets found based on a value of a communication content supplied to a packet during packet reception.

2. The information processor according to claim 1, wherein the redundant communication control section maintains a condition for enabling continued communication, continues communication when communication can continue, and stops the control target when communication cannot continue.

3. The information processor according to claim 2, wherein the condition for enabling continued communication denotes one of: the minimum number of the control targets capable of communication; the maximum number of the control targets incapable of communication; and an identifier for the control target that continues communication even when communication is impossible.

4. The information processor according to claim 3, wherein the redundant communication control section includes an identifier conversion section that locates a communication path error occurrence during at least two communication path error occurrences and converts an identifier for the control target.

5. The information processor according to claim 4, wherein the identifier represents an auto-increment address.

6. A redundant communication control device of an information processor for controlling at least one control target via a network, the information processor comprising a first communication section and a second communication section each including a transmission section for transmitting packet to a network and a reception section for receiving a packet from a network, and using the first communication section when a first transmission of a packet to the network, characterizing that, the information processor comprises an arithmetic section provided with a transmission section and reception section which communicate a packet between the control target, wherein the packet is transmitted to the transmission section of the first communication section when the packet is transmitted from the transmission section of the arithmetic section, the redundant communication control device provides a redundant path switching section which decides to transfer the first packet received by the reception section of the first communication section either to the transmission section of the second communication section or the reception section of the arithmetic section according to the information of the first packet, and which decides to transfer the second packet received by the reception section of the second communication section either to the transmission section of the second communication section or the reception section of the arithmetic section according to the information of the second packet.

7. The redundant communication control device according to claim 6, the redundant communication control device transfers the packet received by the reception section of the second communication section to the transmission section of the second communication section, and transfer the packet received by the reception section of the first communication section to the reception section of the arithmetic section when the condition of the reception state of the packet is normal.

8. The redundant communication control device according to claim 6, wherein the redundant communication control device transfers the packet received by the reception section of the first communication section to the transmission section of the second communication section, and transfer the packet received by the reception section of the second communication section to the reception section of the arithmetic section when the reception state of the packet is abnormal.

9. The redundant communication control device according to claim 6, a communication path state determination section is provided which determines the reception state to be normal when the packet sent form the transmission section of the first communication section is received by the reception section of the second communication section.

10. The redundant communication control device according to claim 6, a communication path state determination section is provided which determines the reception state of the packet to be abnormal when the packet transmitted from the sending section of the first communication section is received by the reception section of the first communication section.

11. The redundant communication control device according to claim 9 or 10, wherein a communication path state determination section is provided which supplies a packet with a communication content calculated by a specified value when all the control targets complete reception.

12. The redundant communication control device according to claim 11, wherein the communication state of the packet is determined to be normal when the number of the control target equals the value calculated from the number of the communication contents of the packet.

13. The redundant communication control device according to claim 11, wherein the communication state of the packet is determined to be abnormal when the number of the control target equals the value calculated from the number of the communication contents.

14. The redundant communication control device according to claim 11, a working counter means is provided which obtain the number of the communication contents of the packet received by the reception section of the first communication section and the packet received by the reception section of the second communication section.

15. The redundant communication control device according to claim 6, an operation management section is provided which specify a number of the control targets.

16. The redundant communication control device according to claim 6, wherein in the communication path state determination section is provided which monitors packets to determine the reception state of the packet.

17. A redundant communication control device of an information processor for controlling at least one control target via a network' the information processor comprising a first communication section and a second communication section each including a transmission section for transmitting packet to a network and a reception section for receiving a packet from a network, and using the first communication section when a first transmission of a packet to the network, characterizing that, the redundant communication control device provides a redundant path switching section which decides to transfer either the packet received by the reception section of the first communication section or the packet received by the reception section of the second communication section to the transmission section of the second communication section according to the reception state of the packet, wherein the redundant communication control device continue the communication with the control target, and stops the communication with the control target according to the number of the control target (object) which can continue the communication, and an identifier for the control target that can continues communication.

18. A redundant communication control device of an information processor for controlling at least one control target via a network' the information processor comprising a first communication section an a second communication section each including a transmission section for transmitting packet to a network and a reception section for receiving a packet from a network, and using the first communication section when a first transmission of a packet to the network, characterizing that, the redundant communication control device provides a redundant path switching section which decides to transfer either the packet received by the reception section of the first communication section or the packet received by the reception section of the second communication section to the transmission section for the second communication section according to the reception state of the packet, wherein the redundant communication control section includes an identifier conversion section which communicates with the control target and locates a communication path error occurrence during at least two communication path error occurrences and converts an identifier of the control target.

\* \* \* \* \*